(12) United States Patent
Sauermann

(10) Patent No.: US 7,752,628 B2
(45) Date of Patent: Jul. 6, 2010

(54) METHOD AND APPARATUS FOR REASSIGNING OBJECTS TO PROCESSING UNITS

(75) Inventor: Volker Sauermann, Dossenheim (DE)

(73) Assignee: SAP AG, Walldorf (DE)

( * ) Notice: Subject to any disclaimer, the term of this patent is extended or adjusted under 35 U.S.C. 154(b) by 1428 days.

(21) Appl. No.: 11/053,899

(22) Filed: Feb. 10, 2005

(65) Prior Publication Data
US 2005/0177833 A1 Aug. 11, 2005

(30) Foreign Application Priority Data
Feb. 10, 2004 (EP) .................................. 04002903

(51) Int. Cl.
*G06F 9/46* (2006.01)
*G06F 15/173* (2006.01)
(52) U.S. Cl. ..................... 718/105; 718/104; 709/226
(58) Field of Classification Search ......... 718/102–105; 709/223, 226; 707/1–2, 10, 100, 200
See application file for complete search history.

(56) References Cited

U.S. PATENT DOCUMENTS

| | | | |
|---|---|---|---|
| 6,173,306 B1 * | 1/2001 | Raz et al. ................... | 718/102 |
| 2002/0046316 A1 | 4/2002 | Borowsky et al. | |
| 2003/0105903 A1 | 6/2003 | Garnett et al. | |
| 2004/0054780 A1 * | 3/2004 | Romero ..................... | 709/226 |

FOREIGN PATENT DOCUMENTS

| EP | 1 524 599 | 2/2008 |
|---|---|---|
| EP | 1 564 638 | 2/2008 |

OTHER PUBLICATIONS

Leinberger et al., "Multi-Capacity Bin Packing Algorithms with Applications to Job Scheduling under Multiple Constraints" 1999, pp. 1-9.*
Chang et al., "Multi-Capacity Bin Packing Algorithms with Applications to Job Scheduling under Multiple Constraints", 1993, pp. 1-6.*
European Search Report for Application No. 04 002 903.5.
Aggarwal G. et al., "The Load Rebalancing Problem," Proceedings of the Fifteenth Annual ACM Symposium on Parallel Algorithms and Architectures, Jun. 2003, pp. 258-265.
Verhoosel J.P.C. et al., "Incorporating Temporal Considerations During Assignment and Pre-Run-Time Scheduling of Objects and Processes," Journal of Parallel and Distributed Computing, Academic Press, Duluth, MN, US, Jul. 10, 1996, pp. 13-31.

(Continued)

*Primary Examiner*—Hyung S Sough
*Assistant Examiner*—Qing-Yuan Wu
(74) *Attorney, Agent, or Firm*—Fnnegan, Henderson, Farabow, Garrett & Dunner, LLP

(57) ABSTRACT

Objects are assigned to processing units of a cluster of processing units, each of the objects having an object size and an object load, each of the processing units having a storage capacity and a load capacity. The method uses an initial object distribution as a starting point. The smoothness of the initial object distribution is improved by processing the objects in sequential order.

23 Claims, 26 Drawing Sheets

OTHER PUBLICATIONS

Maruyama K. et al., "A General Packing Algorithm for Multidimensional Resource Requirements," International Journal of Computer and Information Sciences, vol. 6, No. 2, Jun. 1977, pp. 131-149.

Leinberger W. et al., "Multi-Capacity Bin Packing Algorithms with Applications to Job Scheduling Under Multiple Constraints," URL:http://www-users.cs.umn.edu/{karypis/publications/Papers/PDF/mribinpack.pdf>, May 27, 1999, pp. 1-23.

Lu E.J.L. et al., "An Efficient Load Balancing Technique for Parallel FMA in Message Passing Environment," Proceedings of the Eighth Siam Conference on Parallel Processing for Scientific Computing, URL:http://www.cyut.edu.tw/{jlu/research/parallel/nbody/siam97.ps>, Mar. 1997, pp. 1-8.

"Relational Assignments for Distributed Database Systems," IBM Technical Disclosure Bulletin, IBM Corp., New York, Jun. 1, 1998, pp. 219-225.

Kunz T., "The Influence of Different Workload Descriptions on a Heuristic Load Balancing Scheme," IEEE Transactions on Software Engineering, vol. 17, No. 7, Jul. 1991, pp. 725-730.

Coffman E.G., et al., "Approximation Algorithms for Bin Packing: A Survey," Approximation Algorithms for NP-HARD Problems, URL:http://www.ee.columbia.edu/{egc/webpapers/BPchapter.ps>, 1996, pp. 1-53.

Csirik J., Woeginger G., "Online Algorithms: 1-24 the State of the Art," Springer Berlin, 1998, pp. 147-195.

"Architectures and Infrastructure for Blade Computing," Sun MicroSystems, Sep. 2002, http://www.sun.com/servers/white-papers/blades_wp3.pdf, pp. 1-15.

"The Next Wave: Blade Server Computing," Sun Microsystems, pp. 1-17, www.sun.com/servers/entry/blade.

Fonlupt, C. et al., "Data-Parallel Load Balancing Strategies," Parallel Computing, Oct. 1, 2998, pp. 1665-1684.

\* cited by examiner

Blade 1: Tables 8, 6, 13  Blade 4: Table 15  Blade 7: Tables 19, 17, 7  Blade 10: Table 16
Blade 2: Tables 20, 12  Blade 5: Tables 2, 5  Blade 8: Tables 11, 9
Blade 3: Tables 14, 1  Blade 6: Tables 3, 10  Blade 9: Tables 4, 18

Blade 1: Tables 8, 6, 13   Blade 4: Table 15   Blade 7: Tables 19, 17, 7   Blade 10: Table 16
Blade 2: Tables 20, 12   Blade 5: Tables 2, 5   Blade 8: Tables 11, 9
Blade 3: Tables 14, 1   Blade 6: Tables 3, 10   Blade 9: Tables 4, 18

Blade 1: Tables 8, 6, 13    Blade 4: Table 15    Blade 7: Tables 19, 17, 7    Blade 10: Table 16, 18
Blade 2: Tables 20, 12      Blade 5: Tables 2, 5 Blade 8: Tables 11, 9
Blade 3: Tables 14, 1       Blade 6: Tables 3, 10 Blade 9: Tables 4

Blade 1: Tables 8, 6, 13   Blade 4: Table 15   Blade 7: Tables 19, 17   Blade 10: Table 16, 18
Blade 2: Tables 20, 12    Blade 5: Tables 2, 5   Blade 8: Tables 11, 9
Blade 3: Tables 14, 1     Blade 6: Tables 3, 10  Blade 9: Tables 4, 7

METHOD AND APPARATUS FOR REASSIGNING OBJECTS TO PROCESSING UNITS

TECHNICAL FIELD

The present invention relates to the field of data processing, and more particularly without limitation, to balancing the assignment of objects in a multi-computing environment.

RELATED APPLICATIONS

Priority is claimed to European Patent Application No. 04 002 903.5, now European Patent EP1564638, filed Feb. 10, 2004, the content of which is incorporated herein by reference.

BACKGROUND

Various multi-computing architectures are known from the prior art where a plurality of processing units are coupled to form a cluster. Such architectures are used in parallel processing and also in the emerging field of blade computing.

Blade computing relies on blade servers, which are modular, single-board computers. An overview of blade computing is given in "Architectures and Infrastructure for Blade Computing", September 2002, Sun Microsystems and "THE NEXT WAVE: BLADE SERVER COMPUTING", Sun Microsystems.

A content load balancing blade is commercially available from Sun Microsystems ("Sun Fire™ B10n"). This blade provides traffic and content management functionalities. Content load balancing is achieved based on URLs, CGI scripts and cookies; server load balancing is achieved based on server loads, response times, and weighted round-robin algorithms.

U.S. patent application Ser. No. 10/215,667, now U.S. Pat. No. 7,032,037, shows a web edge server, which comprises a number of blade servers. A switch and an information distribution module are provided for the purpose of balancing. The information distribution module receives an information message, performs processing on the message to determine a destination, and forwards a message toward the determined destination via an internal communications network.

SUMMARY

The present invention provides for a method of assigning objects to processing units of a cluster of processing units, wherein each of the processing units has a certain storage capacity and a certain load capacity. For example, the processing units are similar or substantially identical and have identical storage and load capacities. For example, the processing units are so-called blades for use in blade computing.

An initial distribution of the objects to processing units is provided as a starting point for performing the reassignment of objects to processing units. The initial distribution can be any arbitrary assignment, such as a real life assignment in an existing data processing system, or a pre-calculated assignment with a minimum number of processing units. Further, an ordered sequence of the objects is provided. The sorting criterion of the ordered sequence can be, for example, object size or object load. The redistribution of the objects is performed in the order given by the ordered sequence for improvement of the smoothness of the initial distribution in one or more iterations.

The processing of the objects is performed in the order given by the ordered sequence. In each iteration a set of the processing units is determined that consists of the processing units having aggregated sizes of assigned objects above a size threshold level and/or aggregated loads of assigned objects above a load threshold level. A second set of processing units is constituted by processing units that have aggregated sizes of assigned objects below the size threshold level and aggregated loads of assigned objects below the load threshold level.

Next it is determined whether an object of the ordered sequence fits on a processing unit of the second set. In other words, a determination is made whether a processing unit of the second set has both sufficient remaining storage capacity and sufficient remaining load capacity in order to accommodate an object being presently assigned to a processing unit of the first set. If such a processing unit of the second set can be identified, the considered object is tentatively reassigned to that processing unit of the second set and a statistical size distribution measure and a statistical load distribution measure are calculated for the resulting tentative distribution.

If both the statistical size distribution measure and the statistical load distribution measure for the tentative distribution indicate an improved smoothness of the tentative distribution in comparison to the current distribution, the considered object is reassigned to that processing unit of the second set.

The processing of the objects of the ordered sequence stops when either the first or the second set is empty or the last element of the sequence has been processed. This way the smoothness of the initial distribution of the objects to the processing units can be substantially improved. This has the advantage that usage of the individual processing units in terms of storage capacity and load capacity can be about evenly distributed.

In accordance with a preferred embodiment of the invention, an object can be any data object, such as a table, file, array, list or tree, or a data processing object that requires certain data processing and/or storage resources.

In accordance with a preferred embodiment of the invention, the objects are not directly assigned to processing units but to parallel processes of a distributed data processing task. Each object is assigned to one of the parallel processes and each process is assigned to one of the processing units. Examples for such a distributed data processing task include search engine applications.

In accordance with a preferred embodiment of the invention, the ordered sequence of objects is provided by sorting the objects by size. Alternatively the ordered sequence of objects is provided by sorting the objects by load. This ordered sequence can be used for both iteratively reassigning of objects in order to improve the smoothness of the distribution as well as for providing the initial distribution.

In accordance with a further preferred embodiment of the invention, the initial distribution of objects to processing units is provided by a method of assigning objects to processing units of the cluster of processing units, wherein the storage capacity of a processing unit determines the maximum aggregated size of objects that can be stored by the processing unit and the load capacity of a processing unit determines the maximum aggregated processing load that the processing unit can handle.

For example, the load capacity of a processing unit can be indicative of the maximum number of access operations the processing unit can provide. Access operations may comprise both read accesses (select) and write accesses (update, insert, delete) to objects stored on the processing unit. In addition to hardware restrictions, the load capacity of a processing unit can be further limited by the parallel process of the distributed data processing task that is assigned to a given processing unit in terms of the maximum number of access operations the parallel process (for example of a search engine) can handle. For example, the load capacity can be expressed as the maximum number of access operations per time unit the parallel process running on one of the processing units can handle.

In order to make maximum usage of the available data processing capacity provided by the cluster of processing units, the distribution of the objects over the processing units needs to be balanced. This is accomplished by calculating an index for each object based on object size and object load. For example, the object load is expressed as the expected mean number of access operations per time unit to the object. The objects are sorted by index in order to provide a sequence.

In the following it assumed without restriction of generality that the sequence is sorted in descending order. In this instance the procedure for assigning of objects to processing units starts with the first object of the sequence. One or more of the objects of the sequence are assigned to one processing unit in sequential order until a remaining storage capacity and/or a remaining load capacity of that processing unit is too small for consecutive objects of the sequence. When this condition is fulfilled, the procedure is carried out for the next processing unit, whereby the objects that have been previously assigned to the preceding processing unit are deleted from the sequence. This way a minimum number of processing units that are required for handling a given set of objects can be determined.

In accordance with a preferred embodiment of the invention, the remaining storage capacity of a processing unit is determined by the difference between the storage capacity of the unit and the aggregated size of the objects that have been assigned to the processing unit. Likewise the remaining load capacity of a processing unit is determined by the difference between the load capacity of the unit and the aggregated loads of objects that have been assigned to the processing unit. On the basis of these definitions of the remaining storage capacity and of the remaining load capacity the minimum number of processing units is determined.

In accordance with a further preferred embodiment of the invention, the balancing procedure is performed again in order to further improve the quality of the balancing. For this purpose the largest gap between the aggregated sizes of objects being assigned to one of the processing units and the largest gap between the aggregated loads of objects being assigned to one of the processing units and the load capacity are determined.

The size gap is divided by the minimum number of processing units and the result of the division is subtracted from the maximum storage capacity to provide a size threshold level. Likewise, the load gap is divided by the number of processing units and the result of the division is subtracted from the load capacity to provide a load threshold level. When the procedure for assigning the objects to the processing units is performed again, the definition of the remaining storage capacity is the difference between the aggregated size of objects being assigned to the processing unit and the size threshold level whereas the definition of the remaining load capacity is the difference between the aggregated load of the objects being assigned to the processing unit and the load threshold level. As a result of the renewed performance of the assignment procedure, the gap can be substantially reduced.

In accordance with a further preferred embodiment of the invention, the theoretical storage capacity limit is used as a size threshold. This size threshold is obtained by calculating the difference between the total of the storage capacities of the processing units and the total of the sizes of the objects and dividing the difference by the minimum number of processing units. The result of the division is subtracted from the storage capacity which provides the theoretical limit.

Likewise the theoretical load capacity limit is used as a load threshold. This load threshold is obtained by calculating the difference between the total of the load capacities of the processing units and the total of the loads of the objects and dividing the difference by the minimum number of processing units. The result of the division is subtracted from the load capacity, which provides the theoretical load capacity limit.

On this basis the assignment procedure is performed again whereby the remaining storage capacity is defined as the difference between the aggregated size of the objects of the processing unit and the size threshold, whereas the remaining load capacity is defined a the difference between the aggregated load of the objects of the processing units and the load threshold. Typically it will not be possible to assign all of the objects to the minimum number of processing units on this basis. If this is the case, one or more iterations are performed.

For one iteration, an excess amount of memory is divided by the minimum number of processing units. The result of the division is added to the size threshold. Likewise an excess load is divided by the minimum number of processing units. The result of the division is added to the load threshold. On the basis of the incremented size threshold and/or load threshold the assignment procedure is performed again. This process continues until all objects have been assigned to the minimum number of processing units. This way the quality of the balancing is further improved.

In accordance with a further preferred embodiment of the invention, the size threshold for performing the assignment procedure is varied between the theoretical storage capacity limit and the actual storage capacity. Likewise the load threshold is varied between the theoretical load capacity limit and the actual load capacity. Preferably a new assignment procedure is performed for each permutation of the size threshold/load threshold that can be thus obtained. For each of the resulting assignments of objects to processing units a statistical measure is calculated. This statistical measure is a basis to select one of the assignments for optimal balancing.

In accordance with a further preferred embodiment of the invention, the standard deviation or variance of the sum of the indices of objects assigned to a processing unit is used as a statistical measure. The assignment having the lowest overall quality measure is selected.

In accordance with a preferred embodiment of the invention, the object sizes and object loads are normalized for the calculation of the indices. Preferably an index of an object is calculated on the basis of the sum of the normalized object size and normalized object load and the absolute difference of the normalized object size and normalized object load. Preferably the index is obtained by calculating a linear combination of the sum of the normalized object size and normalized object load and the absolute value of the difference of the normalized object size and normalized object load.

In accordance with a preferred embodiment of the invention each one of the processing units is a blade or a blade server. One of the blades can have a program that implements the principles of the present invention in order to perform balancing. Due to the balancing the available storage and data processing capacities of the blades or parallel processes running on the blades are used in a more or less evenly distributed way. This reduces the need for swap-operations of the blades as the risk of exceeding the capacity limitations of an individual blade or parallel process is decreased. In accordance with a preferred embodiment of the invention the principles of the invention are implemented in an application program running on a personal computer. The application program is provided with a list of objects and the estimated sizes and loads of the objects that need to be handled by the cluster of processing units. On the basis of the object sizes and the object loads the minimum number of processing units that are required for the processing task are determined. This information can form the basis for a corresponding investment decision of a customer.

It is to be noted that the present invention is not restricted to a particular type of object. For example, data objects such as tables, arrays, lists and trees are distributed to processing units, e.g. blades, in accordance with the principles of the present invention. For example, each one of the processing units runs a data processing task to which the respective objects are assigned.

Further features and embodiments of the invention will become apparent from the description and the accompanying drawings.

It will be understood that the features mentioned above and those described hereinafter can be used not only in the combination specified but also in other combinations or on their own, without departing from the scope of the present invention.

It is to be understood that both the foregoing general description and the following detailed description are exemplary and explanatory only and are not restrictive of the invention, as claimed. The foregoing background and summary are not intended to provide any independent limitations on the claimed invention.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

The following description refers to the accompanying drawings in which, in the absence of a contrary representation, the same numbers in different drawings represent similar elements. The implementations in the following description do not represent all implementations consistent with principles of the claimed invention. Instead, they are merely some examples of systems and methods consistent with those principles. It is to be understood that both the foregoing general description and the following detailed description are exemplary and explanatory only and are not restrictive of the invention, as claimed.

Figure 1:
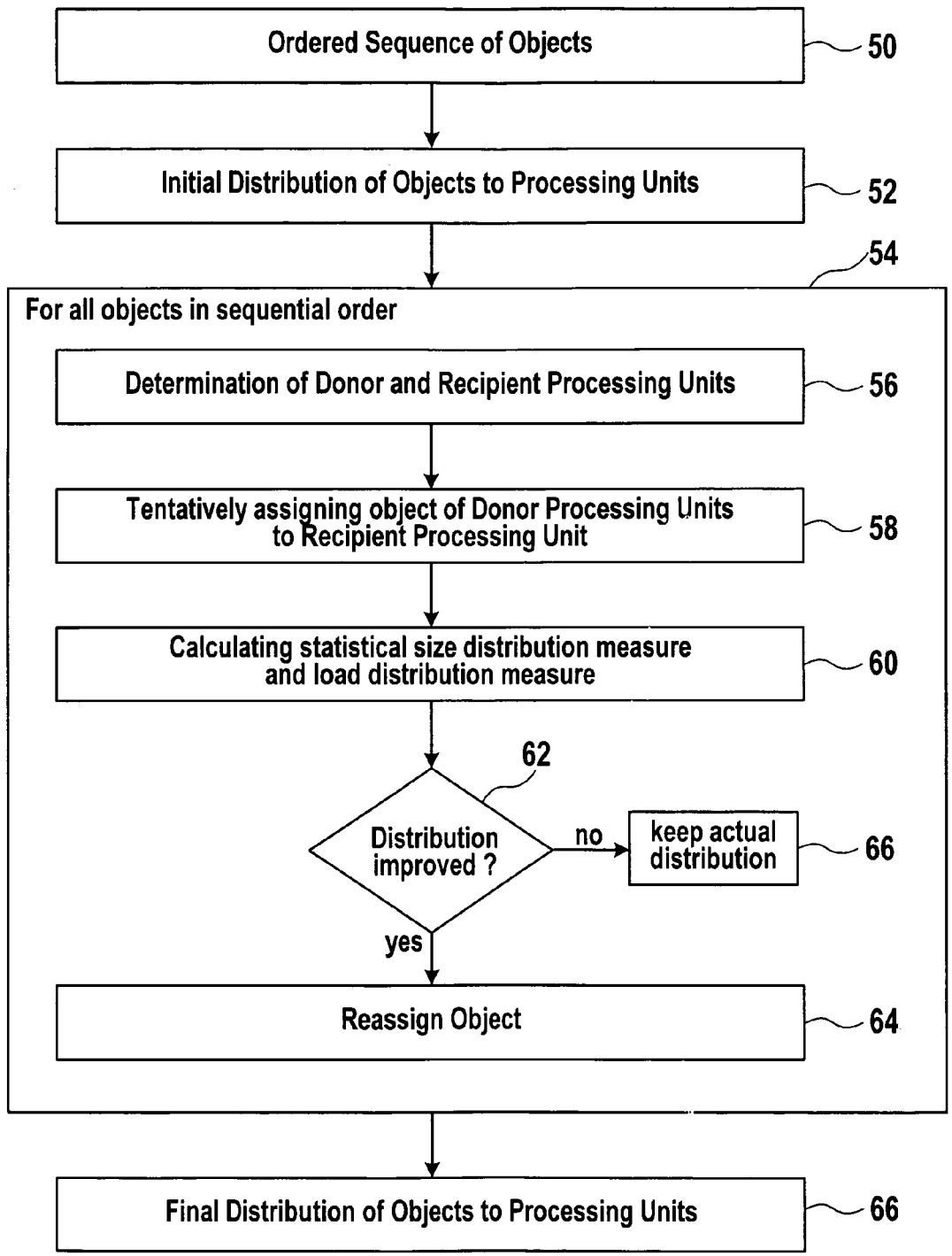
FIG. 1 shows a flowchart of a preferred embodiment of a method of the invention.

FIG. 1 shows a method for improving the smoothness of an initial distribution of objects to processing units. In step 50 an ordered sequence of objects is provided. The sorting criterion of the ordered sequence is either object size or object load in the example considered here. Without restriction of generality, it is assumed in the following that the sorting criterion is object size.

Hence, the first element of the ordered sequence provided in step 50 is the largest object that requires the largest storage space. For the purpose of explanation only and without restriction of generality, it is assumed in the following that the ordered sequence is sorted in descending order of the object sizes.

In step 52 an initial distribution of objects to processing units is provided.

In the following step a loop 54 is performed for all objects of the sequence in the order of the sequence. In step 56 of loop 54 a determination of donor and recipient processing units is made on the basis of the current distribution of objects to processing units. In the first iteration when the first object in the ordered sequence is considered, the current distribution is the initial distribution provided in step 52.

A donor processing unit is a processing unit that belongs to the first set of processing units, i.e. that has an aggregated size of assigned objects above a size threshold level and/or an aggregated load of assigned objects above a load threshold level. Those processing units that are not donor processing units are by definition recipient processing units, i.e. processing units belonging to the second set having aggregated object sizes below the size threshold and aggregated object loads below the load threshold.

The size threshold that is used for differentiating donor and recipient processing units is the theoretical storage capacity minimum per processing unit that is obtained by calculating the total of the sizes of all objects to be assigned to the processing units divided by the number of processing units. Likewise the load threshold is the theoretical load capacity minimum per processing unit that is obtained by calculating the total of the loads of all objects to be assigned to the processing units divided by the number of the processing units.

In step 58 of loop 54 an object presently assigned to a donor processing unit is tentatively reassigned to a recipient processing unit that has sufficient remaining storage capacity and sufficient remaining load capacity for accommodating the considered object. In step 60 a statistical size distribution measure and a statistical load distribution measure are calculated for the resulting tentative distribution of objects to processor units.

The statistical size distribution measure is defined such that it indicates a degree of smoothness of the size distribution.

Likewise, the statistical load distribution measure is defined such that it indicates a degree of smoothness of the load distribution.

In step 62 it is determined whether the tentative distribution has a higher degree of smoothness in comparison to the current distribution, i.e. the initial distribution for the first iteration of loop 54. The criterion for an improved smoothness of the tentative distribution is as follows:

(i) the statistical size distribution measure of the tentative distribution is below the statistical size distribution measure of the current distribution, and (ii) the statistical load distribution measure of the tentative distribution is below the statistical load distribution measure of the current distribution.

If both criteria (i) and (ii) are met, the tentative reassignment is asserted and the object is reassigned to the recipient processing unit in step 64. Thus a new current distribution is obtained. The new current distribution forms the basis for the consecutive iteration of loop 54 with respect to the next object in the ordered sequence.

If the smoothness of the tentative distribution is not improved in comparison to the current distribution, the current distribution is kept the same for the purpose of the consecutive iteration.

After all objects of the ordered sequence have been processed in loop 54 or if there are no donor or no recipient processing units, loop 54 stops. As a result the final distribution of objects to processing units having an improved smoothness in comparison to the initial distribution is output in step 66.

Figure 2:
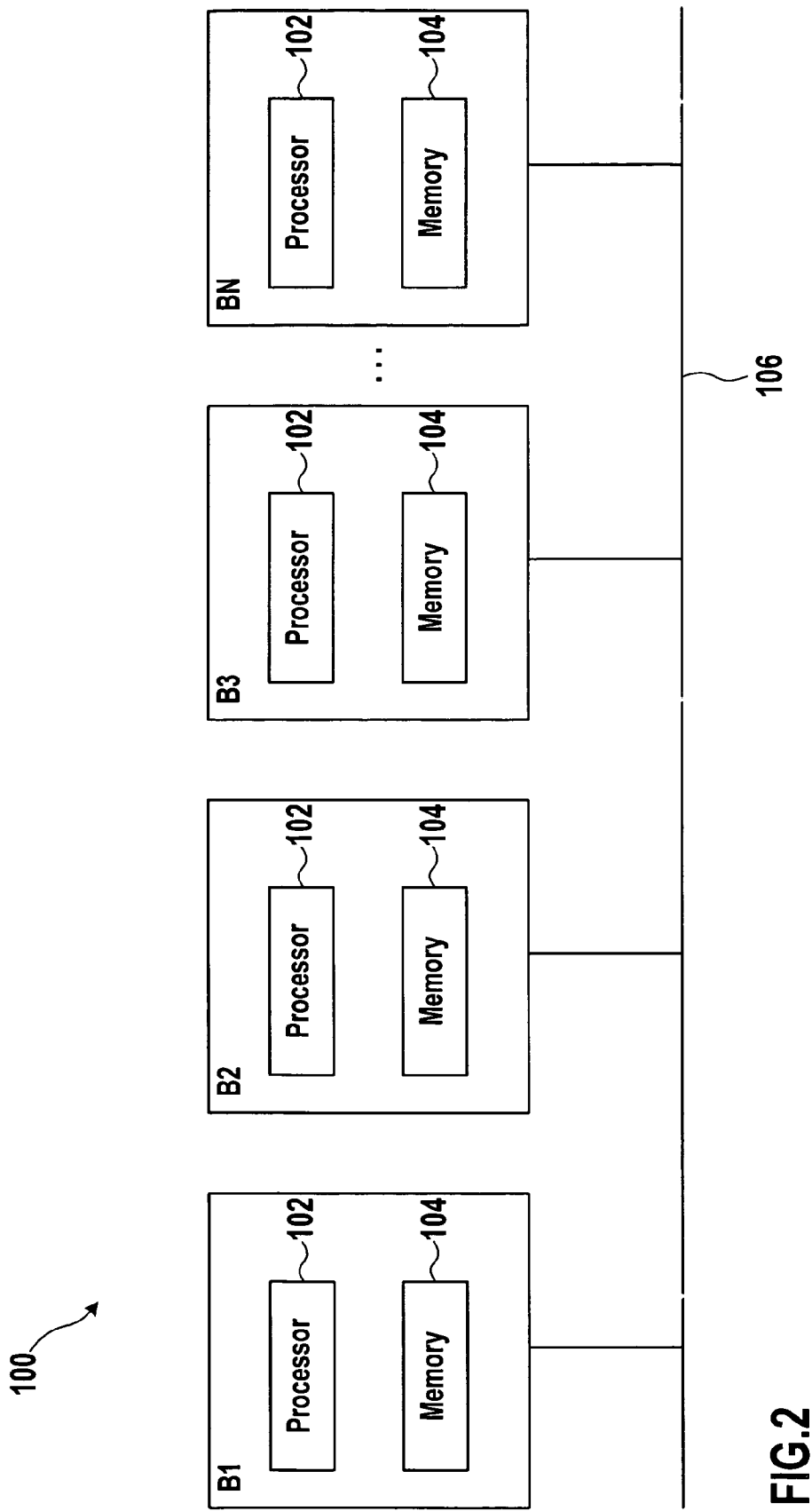
FIG. 2 is a schematic block diagram of a modular computer system having a cluster of blades.

FIG. 2 illustrates an application of the method of FIG. 1 to blade computing. FIG. 2 shows cluster 100 of blades B1, B2, B3, . . . BN. Each one of the blades has processor 102 and memory 104. In the example considered here, all memories 104 have the same storage capacity and all blades have the same load capacity. The blades are coupled by a network 106, such as a bus system. The number N of blades of cluster 100 needs to be chosen such that a given number of M objects of varying sizes and loads can be handled.

For example, cluster 100 implements a so-called search engine. In this instance identical search processes run on each one of the blades. The assignment of data objects, such as index tables, to blades can be stored in a dispatcher unit (not shown on the drawing) of cluster 100. This way data objects are assigned to blades and data processing tasks running on the blades.

Figure 3:
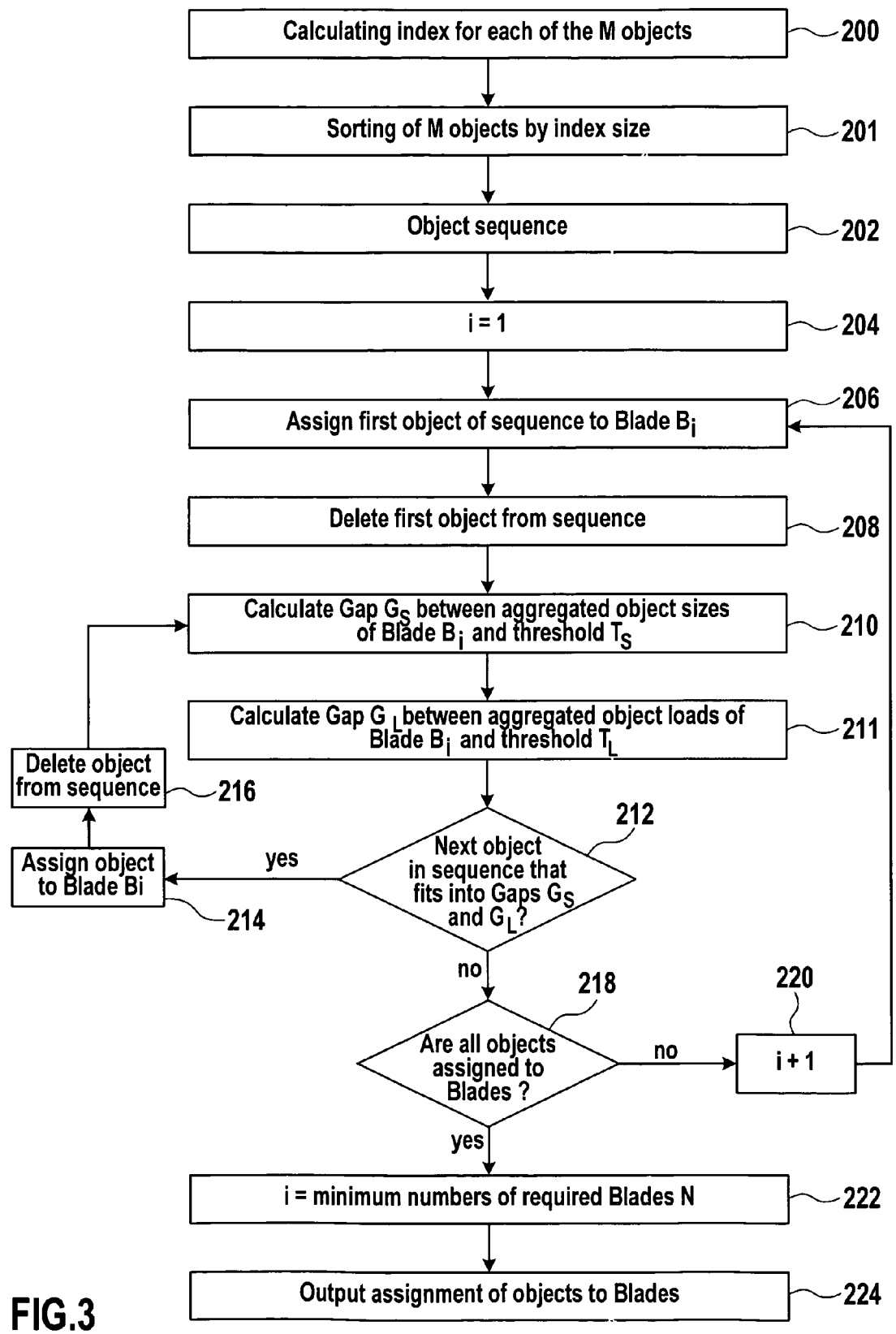
FIG. 3 is illustrative of a flow diagram for assigning objects to blades and for determining the minimum number of required blades.

FIG. 3 shows a procedure for assigning the objects to blades and to thereby determine the minimum value for N.

In step 200 a sorting index is calculated for each one of the M objects. A sorting index of an object is indicative of the amount of blade resources the object requires. The sorting index serves to sort the objects in decreasing order of blade resource requirements.

For example the sorting index is calculated on the basis of the sum of the normalized object load and normalized object size plus the absolute value of the difference of the normalized load and size or a linear combination thereof.

In step 201 a sorting operation is performed in order to sort the M objects by sorting index. The corresponding object sequence is provided in step 202. In step 204 the index i for the blades is initialized to 1.

In step 206 processing of the object sequence starts with the first object of the sequence, i.e. the object having the largest sorting index value. The first object of the sequence is assigned to a first one of the blades, i.e. blade B1, in step 206. In step 208 the first object that has been assigned to blade B1 is deleted from the sequence.

In step 210 the sizes of the objects that have already been assigned to blade B1 are summed up in order to provide an aggregated object size of blades B1. Next the size of a gap $G_S$ between the aggregated object size of blade B1 and a size threshold $T_S$ is calculated. When the assignment procedure of FIG. 2 is carried out the first time, the size threshold $T_S$ is the storage capacity of one of the blades.

In step 211 the loads of the objects that have already been assigned to blade B1 are summed up in order to provide an aggregated load of blade B1. Next a gap $G_L$ between the aggregated object loads of blade B1 and a load threshold $T_L$ is calculated. When the assignment procedure of FIG. 2 is carried out the first time, the load threshold $T_L$ is the load capacity of one of the blades.

In step 212 it is determined whether there is a next object in the ordered sequence that fits into both gaps $G_S$ and $G_L$. In other words, a consecutive object following the first object in the object sequence that has an object size small enough to fit into gap $G_S$ and at the same time has an object load that is small enough to fit into $G_L$ is searched.

The next consecutive object in the sequence that fulfils this condition is assigned to blade B1 in step 214 and deleted from the sequence in step 216 before the control goes back to step 210.

If there is no such object that fulfils the condition of step 212, step 218 is carried out. In step 218 it is determined whether all objects have already been assigned to blades. In other words, in step 218 it is checked whether the sequence is empty. If this is not the case the index i is incremented in step 220 and the control goes back to step 206 in order to assign remaining objects of the sequence to the next blade B2.

If the contrary is the case the index i is the minimum number N of blades that are required to handle the M objects, i.e. i=N. This number is output in step 220. The minimum number N of blades that are required to handle the M objects can be a basis for an investment decision for purchasing of a corresponding number of blades. The assignment of objects to blades is output in step 224 in order to visualize the quality of the object size balancing.

Figure 4:
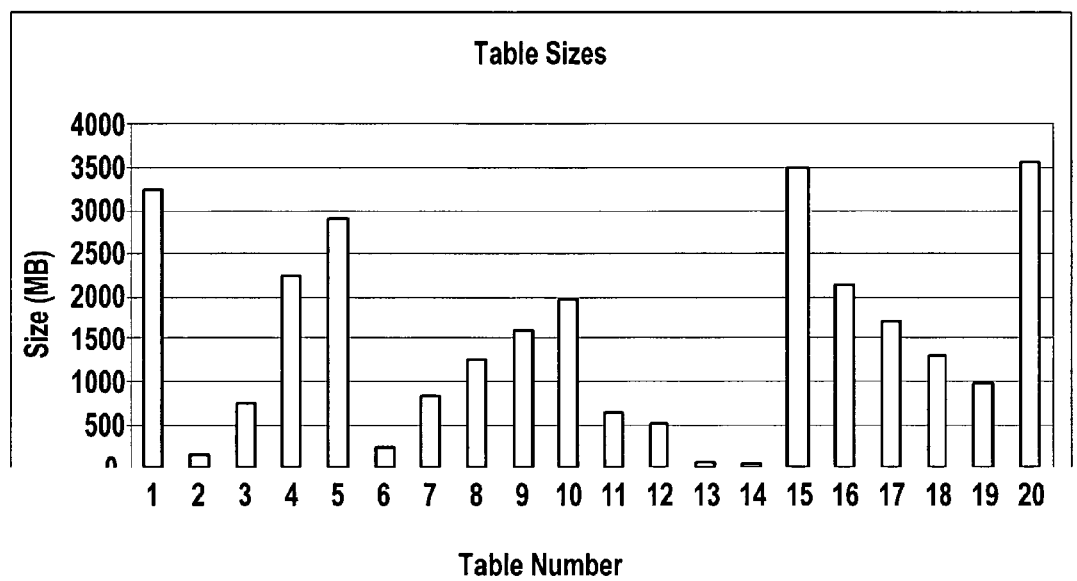
FIG. 4 is an example for tables that need to be assigned to blades.

FIG. 4 shows an example of objects to be assigned to blades. In the example considered here the objects are a number of 20 different tables having various sizes between 50 MB and 3,566 MB as indicated in FIG. 4. For example, table 1 has a size of 3,250 MB, table 2 has 150 MB, table 3 has 750 MB, etc. The table sizes can be actual table sizes or average table sizes that have been obtained by monitoring a real-life data processing system. Alternatively the table sizes are estimates for the purpose of planning cluster 100 in FIG. 2.

Figure 5:
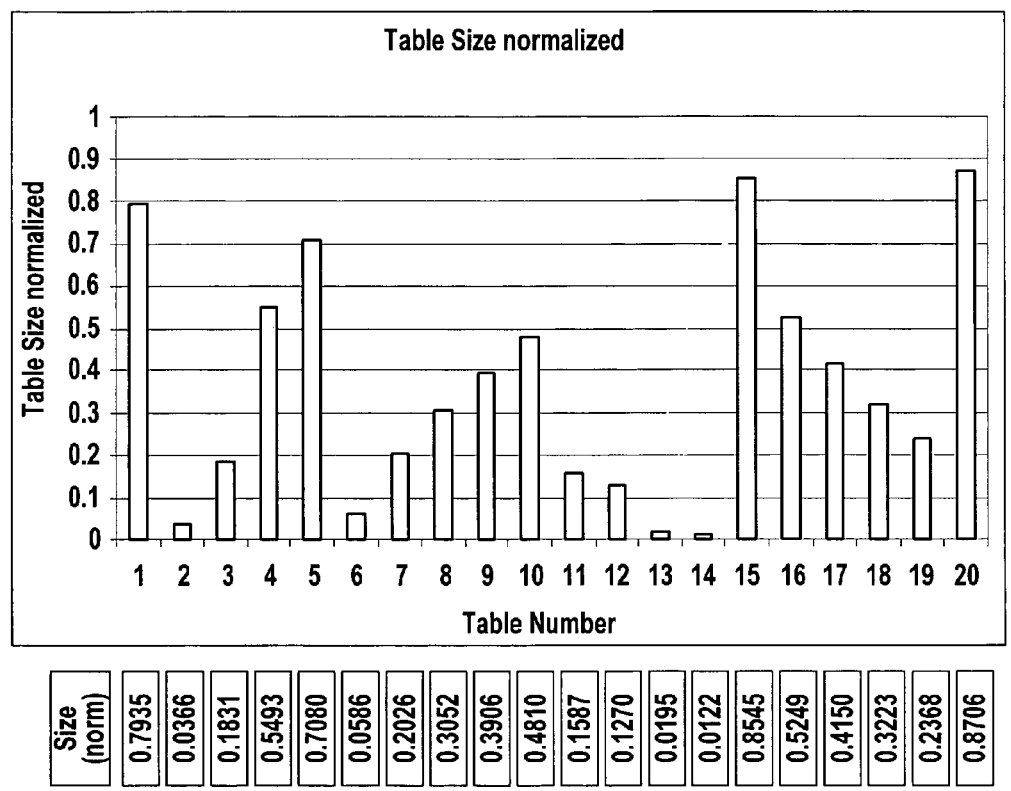
FIG. 5 shows the normalized size distribution of the tables of FIG. 4.

FIG. 5 shows the normalized table sizes of the tables of FIG. 4. The normalized size of a table is obtained by dividing the table size by the maximum storage capacity of one of the blades.

Figure 6:
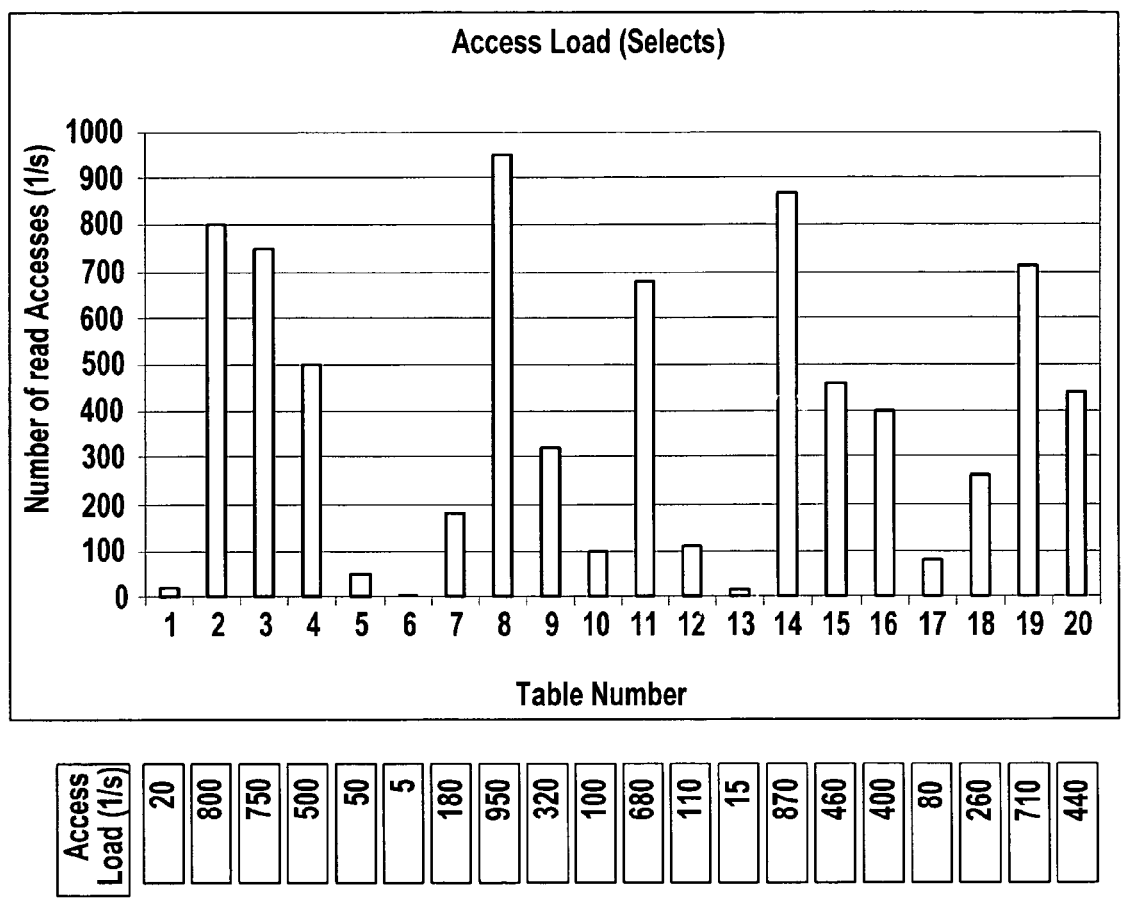
FIG. 6 shows the loads of the tables in terms of the mean number of read accesses per second.

FIG. 6 shows the loads of the tables. In the preferred embodiment considered here the mean number of access operations (selects) per second that are performed or expected to be performed with respect to a table is used as a load indicator. In the example considered here, the load as expressed by the number of read accesses per second to a table varies between five read accesses per second (table 6) and 950 read accesses per second (table 8). The table loads given in FIG. 6 can be actual table loads or average table loads that have been obtained by monitoring a real-life data processing system. Alternatively the table loads are estimates or simulation results for the purpose of planning cluster 100.

Figure 7:
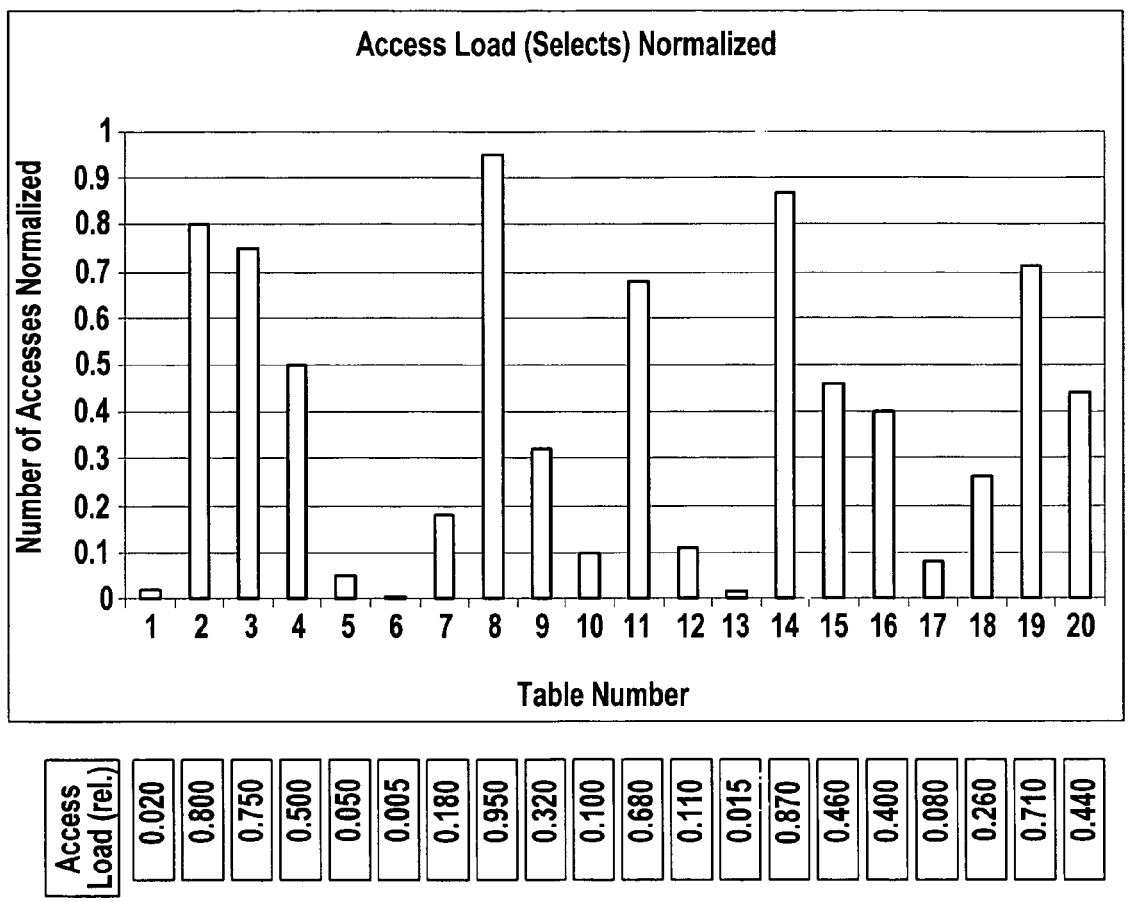
FIG. 7 shows the normalized load distribution of the tables of FIG. 4.

FIG. 7 shows the normalized table loads. The normalized table load of a given table is obtained by dividing the number of read accesses per second of that table by the load capacity of one of the blades.

In the preferred embodiment considered here, the storage capacity of a blade is 4,096 MB. Hence a normalized table size of one indicates that the table has the absolute maximum size that can be handled by a given blade hardware.

The load capacity of a blade is the maximum possible access load that can be handled by a core engine running on one of the blades in the example considered here. This maximum value can be determined by benchmarks, by experiment or simulation. The load capacity depends on various parameters such as hardware and software characteristics and network bandwidth if a network is used to perform the table accesses. In the preferred embodiment considered here, the load capacity of one of the blades is 1,000 read accesses per second. For the purpose of explanation only read accesses are considered here. However, other typical data processing tasks, such as accesses that involve changes to the data, can also be taken into consideration for determining load capacity and table loads.

Figure 8:
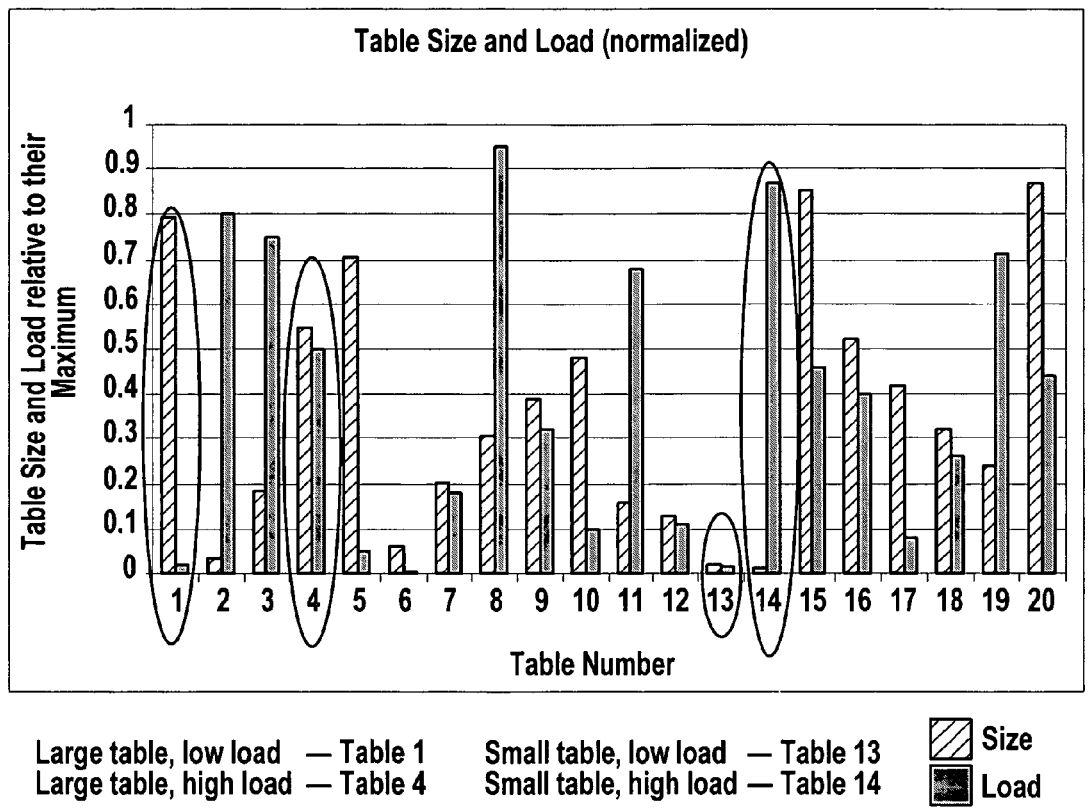
FIG. 8 shows the normalized sizes and loads per table.

FIG. 8 shows a diagram illustrating the various normalized table sizes and table loads. As apparent from FIG. 8, there are tables that require only a minimum amount of blade resources, especially table 13, that has a small table size and a low table load. On the other hand, there are tables that require a large amount of blade resources as they have both large table size and high table load. The distribution of tables to blades aims to balance the usage of the respective blade resources with respect to both size and load. The two constraints, i.e. size and load, are combined into a common sorting index that provides an objective measure for the amount of blade resources a given table requires.

The following definition of the sorting index is used for the purposes of explanation only and without restriction of generality:

Sorting index=W1*(size+load)+W2*absolute value(size−load), where size is the table size,
load is the table load
W1 is a weighting factor for (size+load) and
W2 is a weighting factor for the absolute value of the difference of size and load.

For the purposes of the following example the weighting factors W1 and W2 are set to one without restriction of generality.

In this case the above expression evaluates as follows:
If size>load: sorting index=2*size
If size=load: sorting index=2*size=2*load
If size<load: sorting index=2*load.

Figure 9:
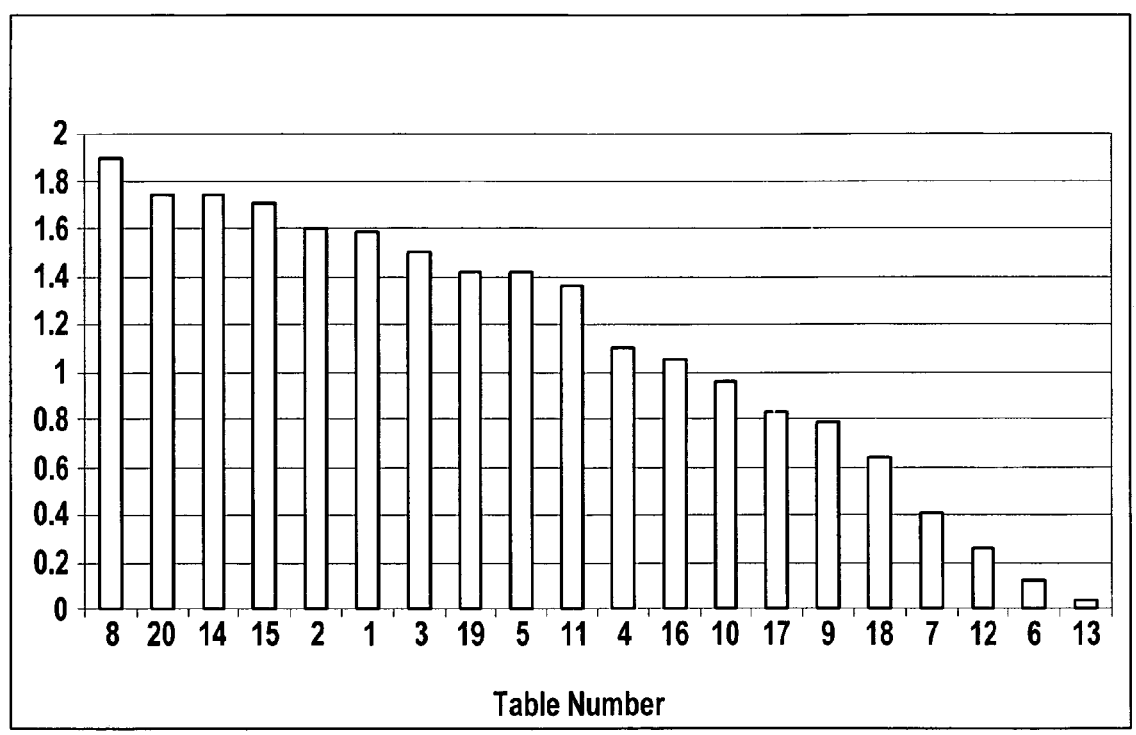
FIG. 9 shows a sorted sequence of the tables.

FIG. 9 shows a sorted sequence in descending order of the sorting indices of the tables. The table that has the largest sorting index value and thus requires the largest amount of blade resources is table 8, whereas the table having the smallest sorting index value and which does require the lowest amount of blade resources is table 13 as apparent from FIG. 9.

Figure 10:
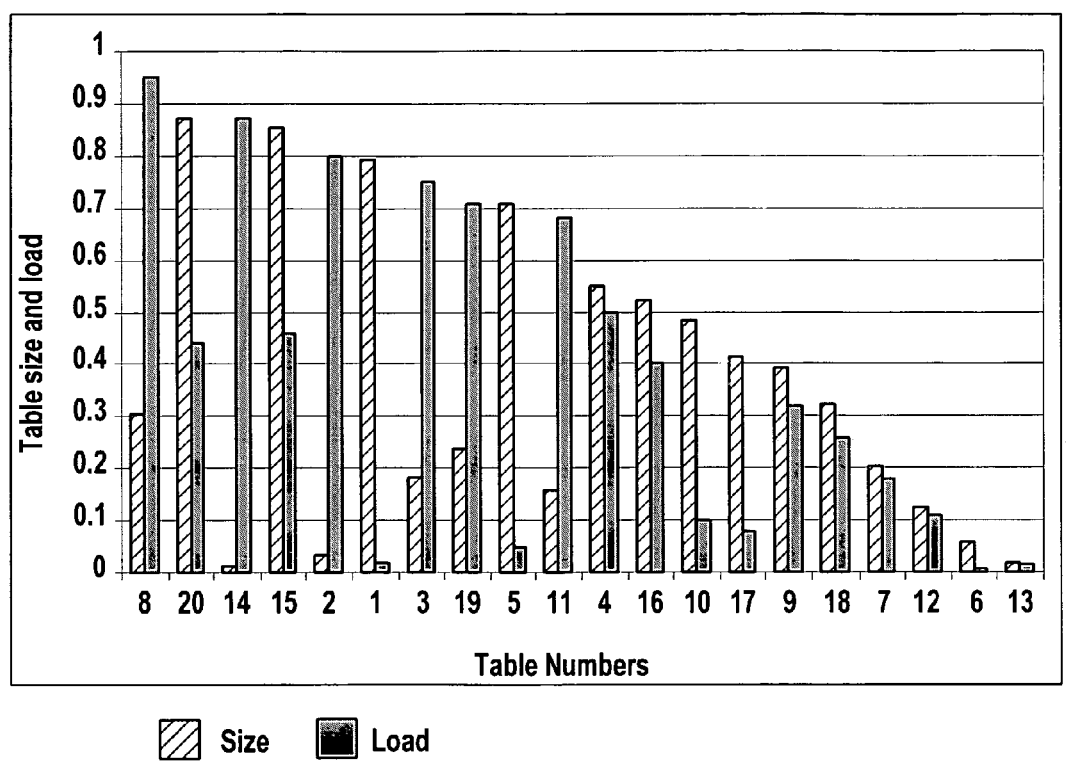
FIG. 10 shows the sorted sequence of the tables illustrating the normalized sizes and loads of each table.

FIG. 10 shows the sorted sequence of FIG. 9 illustrating the normalized table sizes and table loads of the individual tables.

Figure 11:
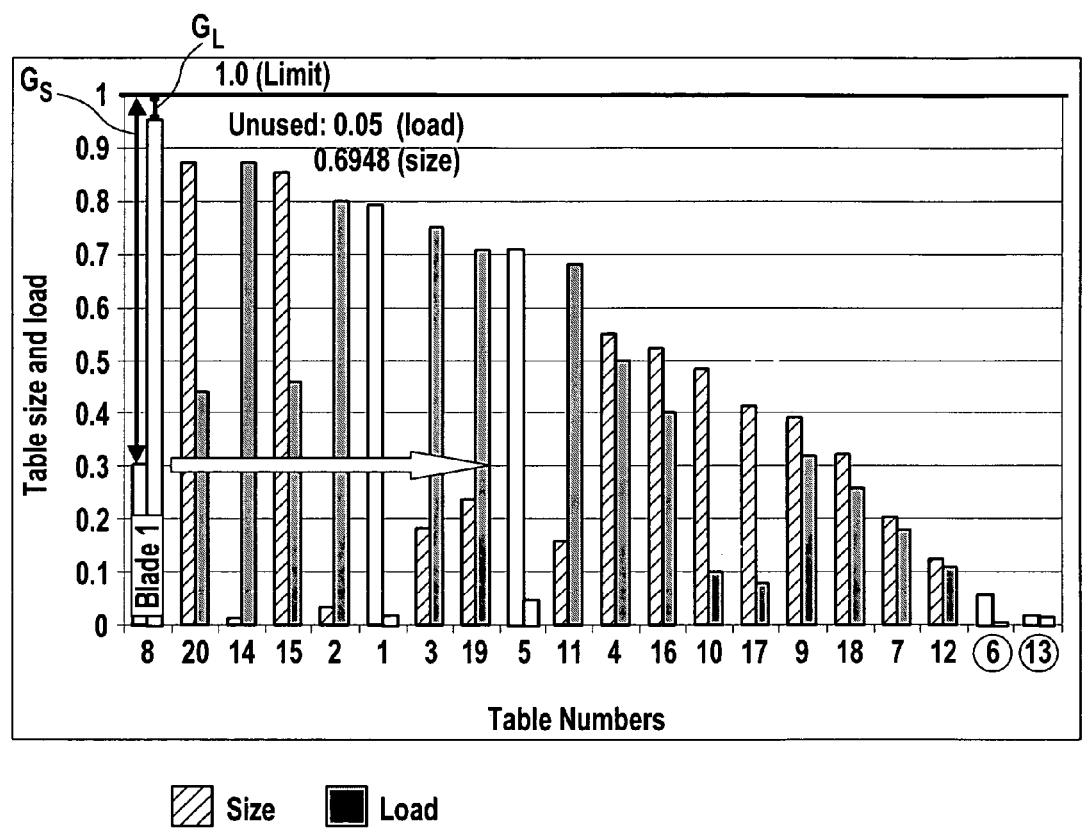
FIGS. 11-15 show the assignment of tables to blade 1 of the cluster of blades.

FIG. 11 illustrates the first iteration for assigning tables to blades based on the ordered sequence as shown in FIGS. 9 and 10. It is assumed that each one of the blades has a storage capacity that corresponds to a normalized size threshold $T_S=1$ and a load capacity that corresponds to a normalized load threshold $T_L=1$.

The assignment procedure starts with the first table of the sorted sequence, i.e. table 8. Table 8 is assigned to blade 1 as illustrated in FIG. 10. This results in a normalized gap $G_S$ of unused storage capacity $G_S=0.6948$ and a gap $G_L$ of unused load capacity $G_L=0.05$.

Figure 12:
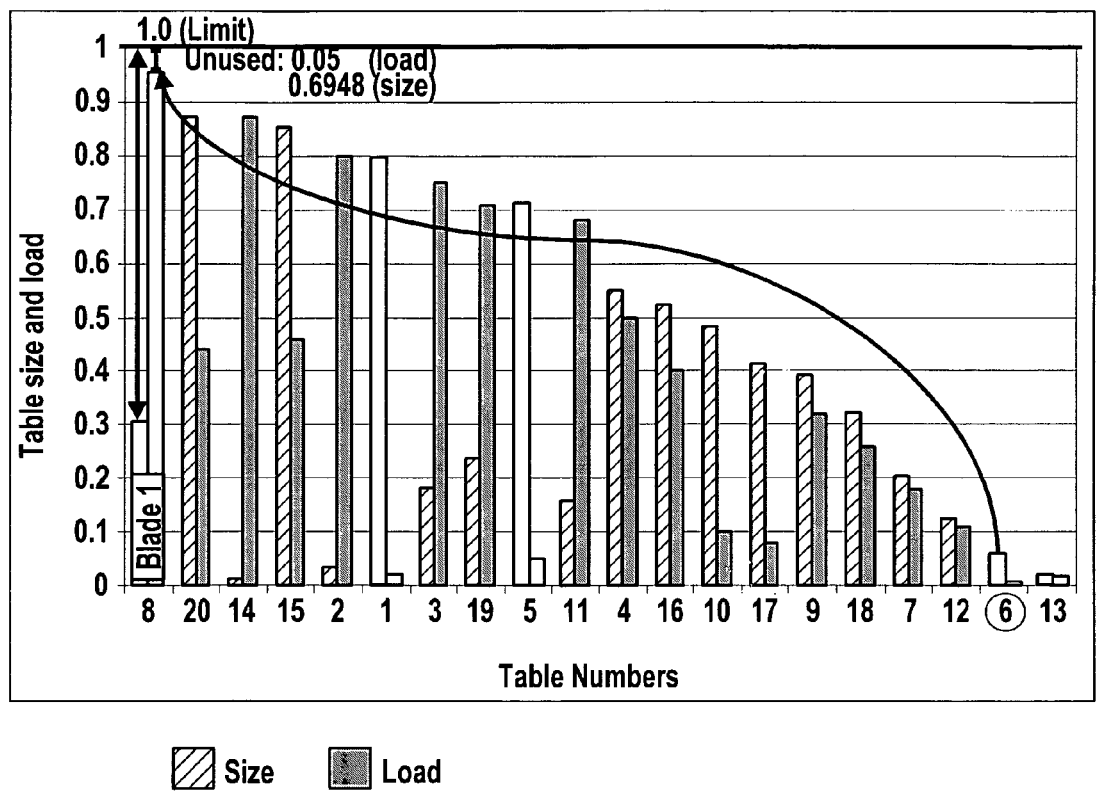

Next consecutive tables in the ordered sequence are searched that have table sizes and table loads that fit into the respective gaps $G_S$ and $G_L$. These are tables 6 and 13. As table 6 precedes table 13 in the ordered sequence, it is assigned to blade 1 as illustrated in FIG. 12.

Figure 13:
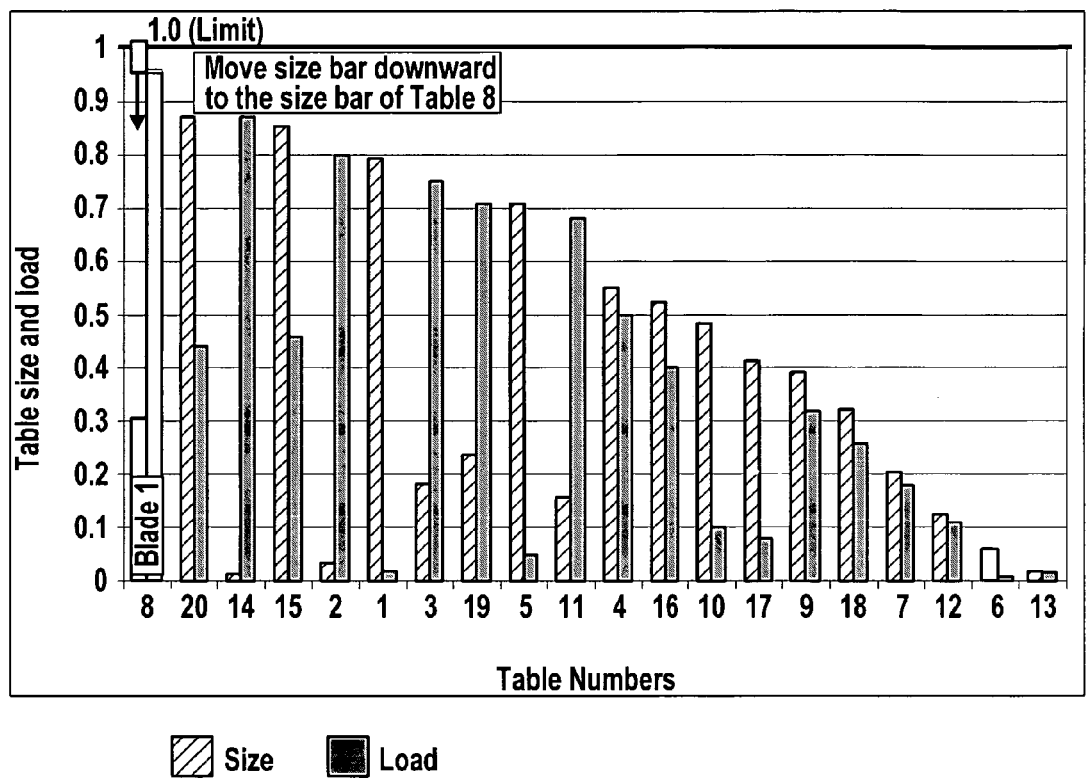
Figure 14:
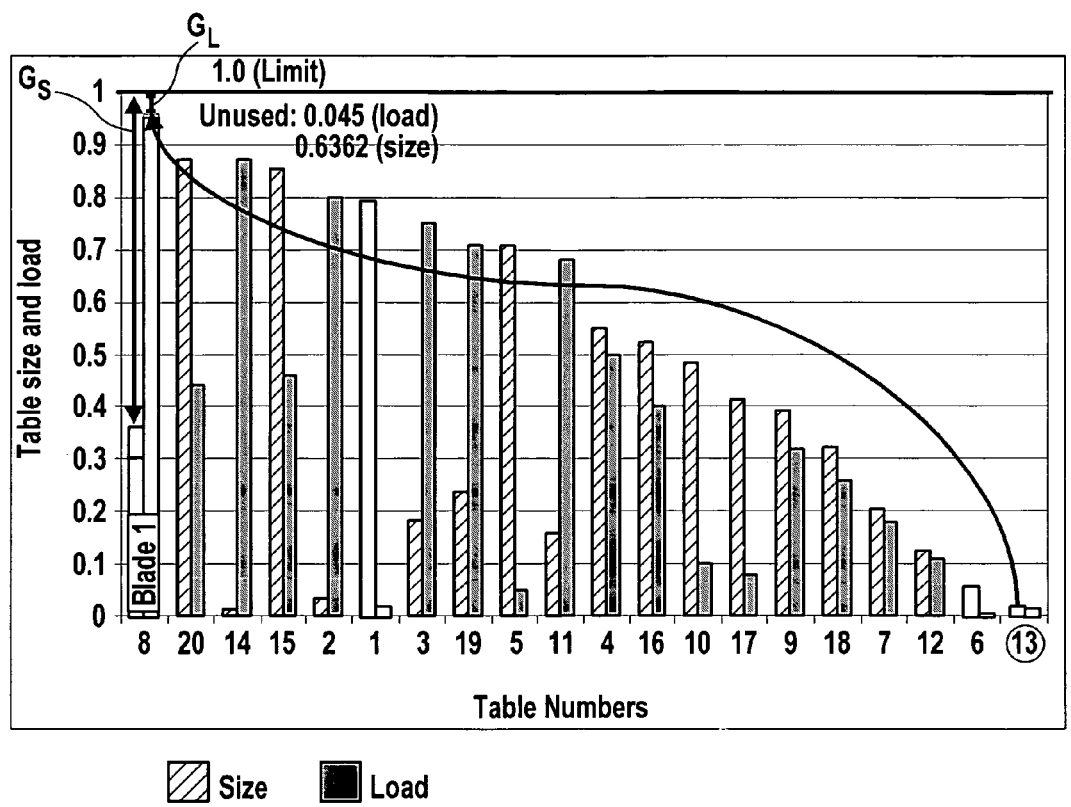

Next the aggregated table size and the aggregated table load of blade 1 is updated as illustrated in FIG. 13. This results in a updated normalized gap $G_S=0.6362$ and an updated normalized gap $G_L=0.045$ as illustrated in FIG. 14. Now tables of the ordered sequence that are consecutive to table 8 that fit into both gaps $G_S$ and $G_L$ are searched.

Figure 15:
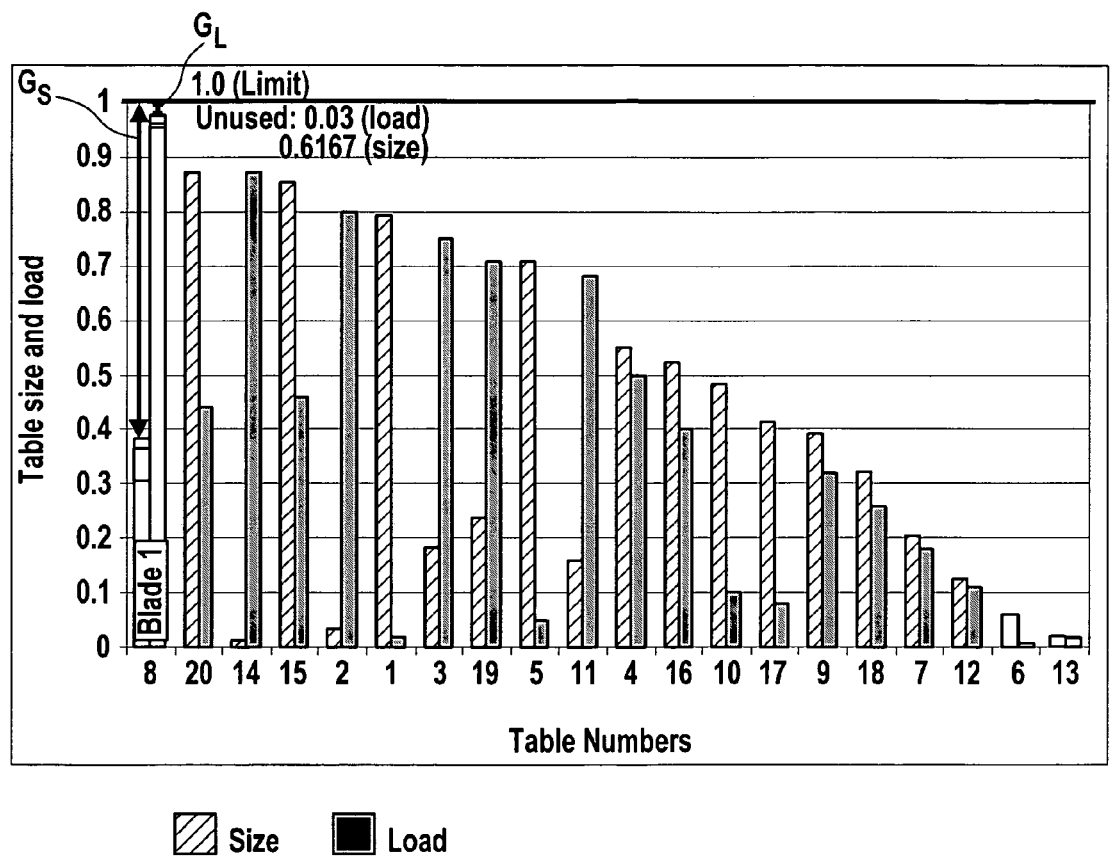

The only table that fulfils both conditions is table 13 which is thus assigned to blade 1 as illustrated in FIG. 14. The result is shown in FIG. 15. The updated normalized gap $G_S$ is 0.6167 and the updated normalized gap $G_L$ is 0.03. No table within the ordered sequence satisfies both constraints.

Figure 16:
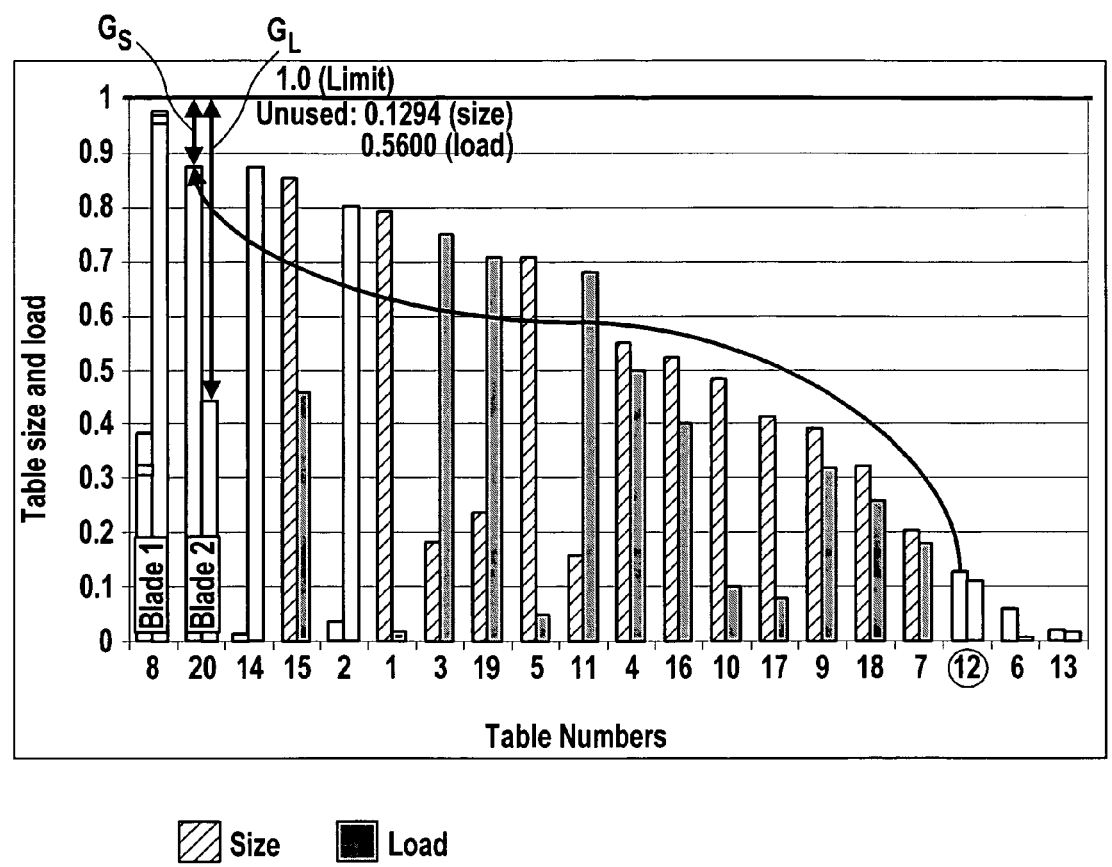
FIGS. 16-17 show the assignment of tables to blade 2.

As there remain unassigned tables in the sequence an additional blade 2 is required as illustrated in FIG. 16. By definition the first table of the remaining ordered sequence, i.e. table 20 is assigned to blade 2. This results in normalized gaps $G_S=0.1294$ and $G_L=0.5600$. The only table that satisfies both constraints is table 12 which is thus moved onto blade 2 as illustrated in FIG. 16.

Figure 17:
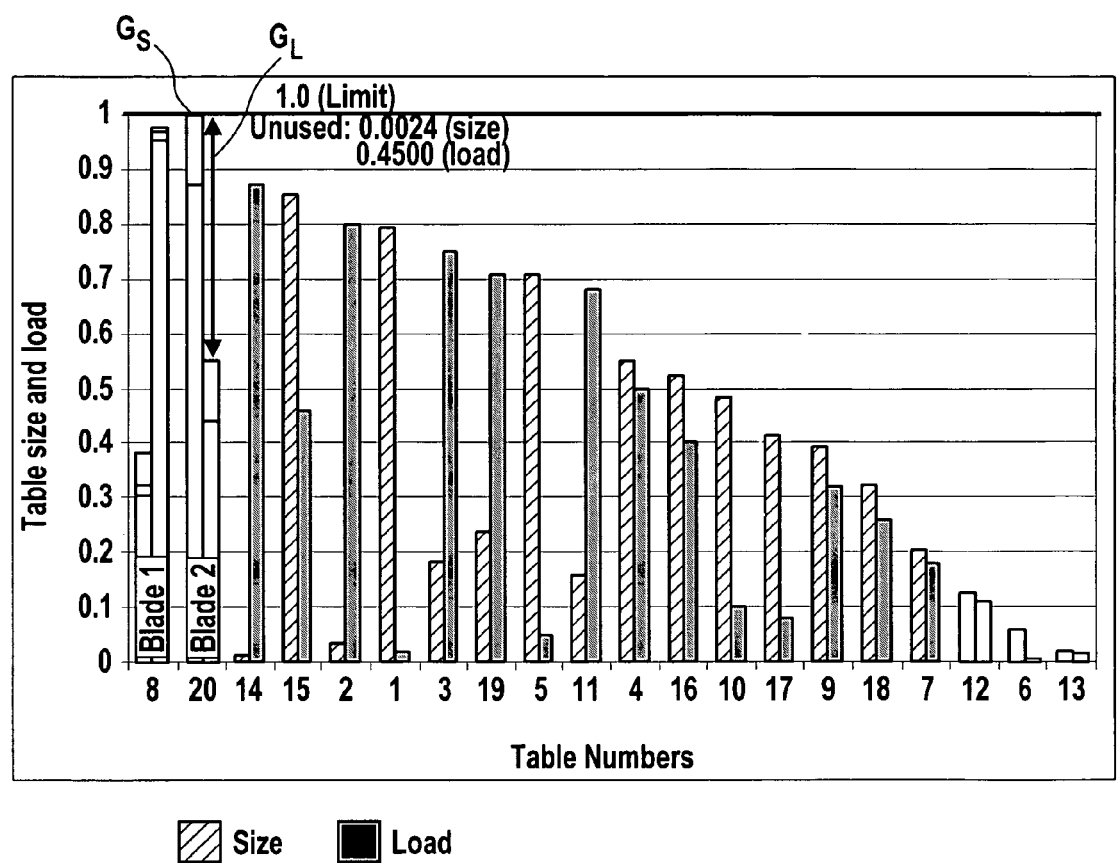
Figure 18:
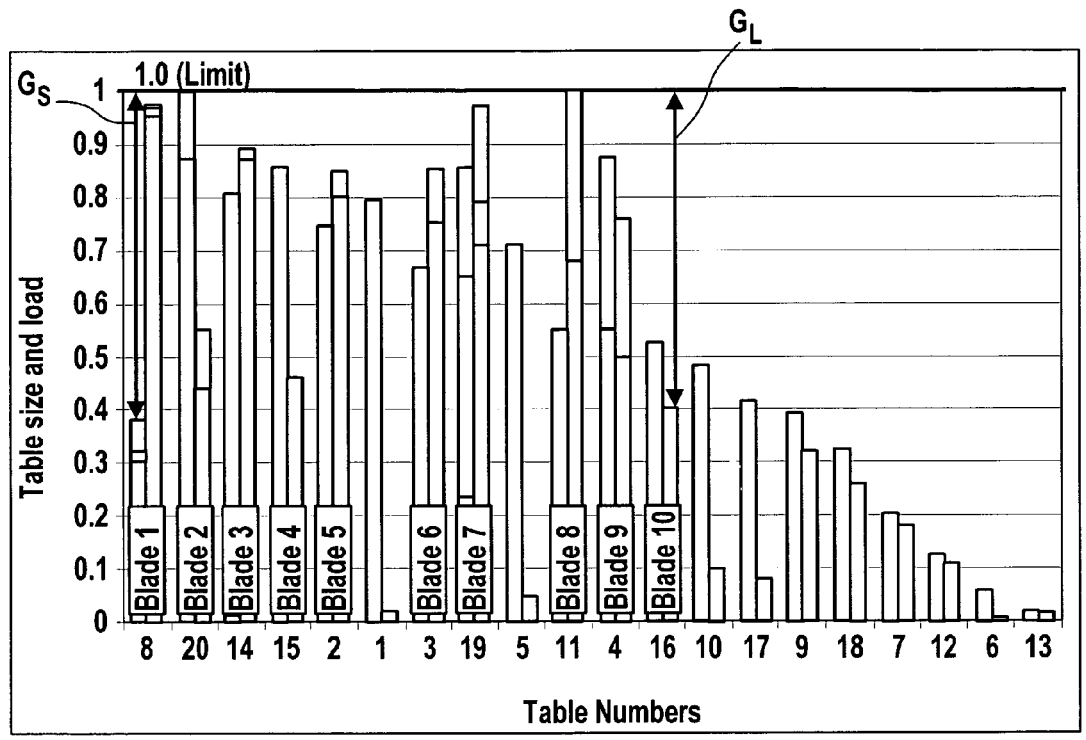
FIG. 18 shows the resulting assignment of tables to blades that is obtained on the basis of the method of FIG. 3.
Figure 19:
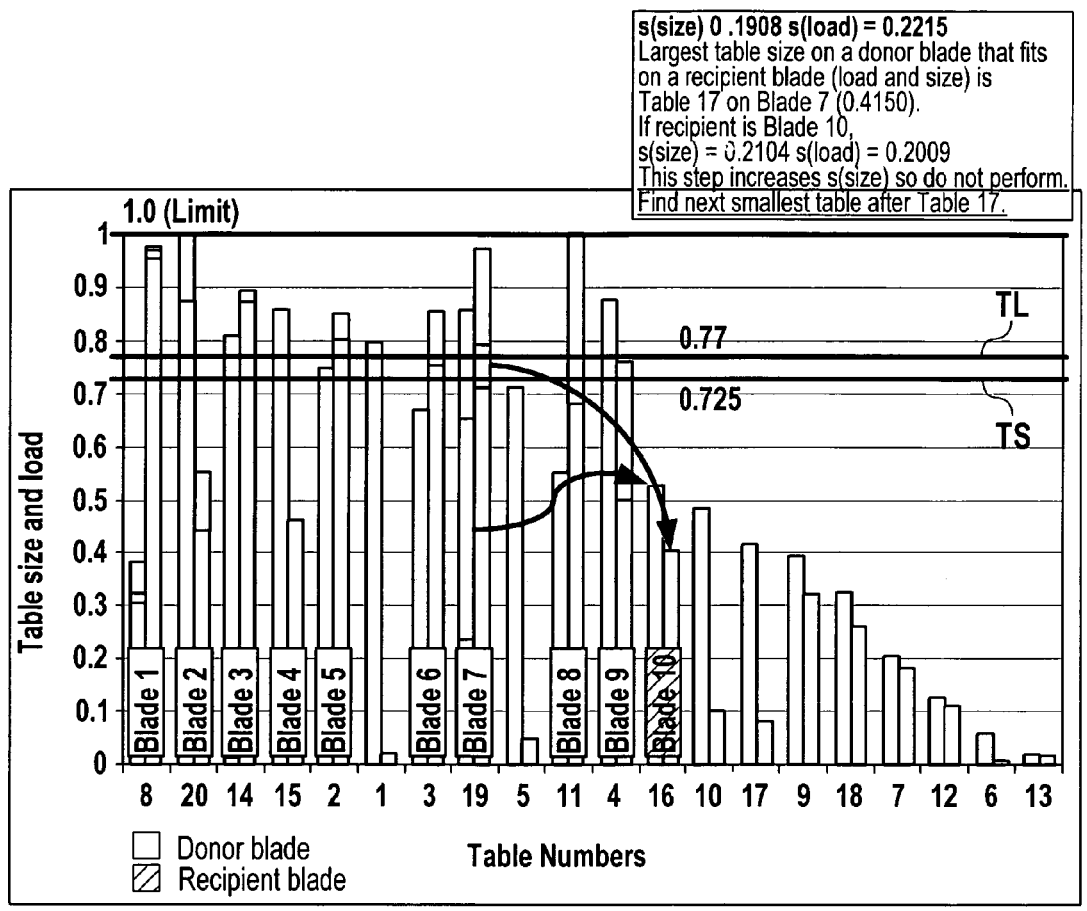
FIGS. 19-23 illustrate the reassignment of tables to blades on the basis of the method of FIG. 1 using the assignment of FIG. 18 as an initial assignment.
Figure 20:
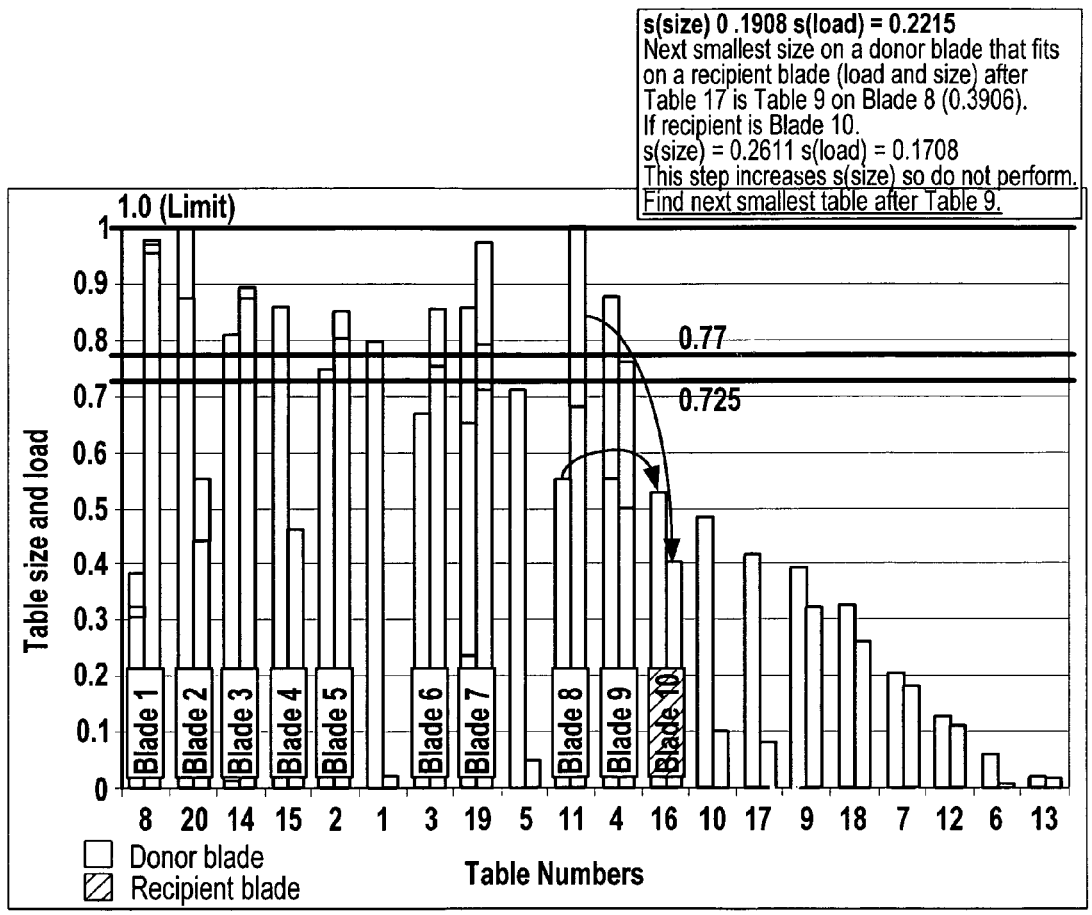
Figure 21:
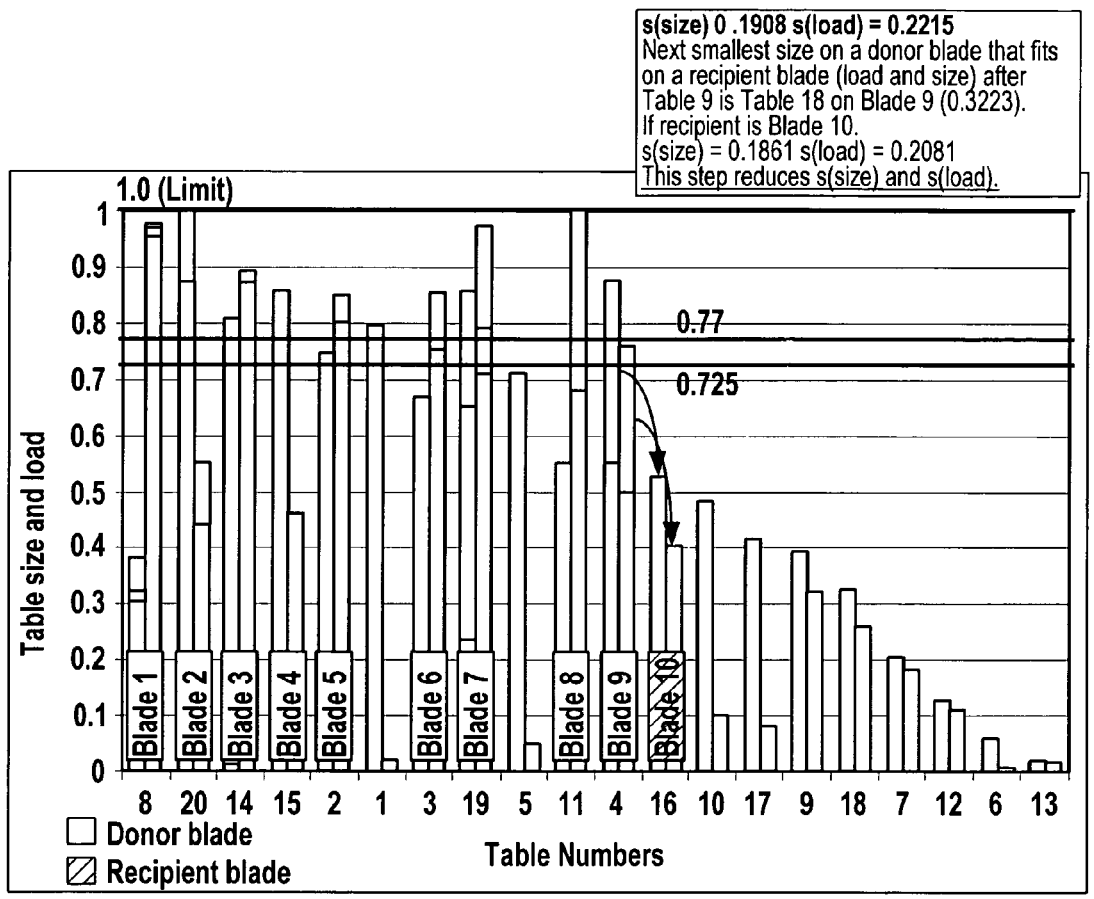

FIG. 17 illustrates the result of this reassignment. The updated normalized gap $G_S$ is 0.0024 and the updated normalized gap $G_L$ is 0.4500. None of the tables of the remaining ordered sequence satisfies these constraints such that an additional blade 3 is required, etc. This procedure is carried out until the ordered sequence is empty, i.e. after all tables have been assigned to one blade. The resulting assignment of blades and the resulting number of blades is illustrated in FIG. 18. In the example considered here the minimum number N of blades that is required for handling of all of the tables is N=10.

In order to improve the quality of the balancing the method of FIG. 1 can be carried out on the basis of the result provided by the method of FIG. 3.

In other words, the assignment of tables to blades as shown in FIG. 18 is used as the initial distribution required in step 52 of the method of FIG. 1. Further the sequence of tables as shown in FIG. 4 is sorted by table size in order to provide the ordered sequence required for step 50 of FIG. 1. The first table of the ordered sequence is thus the table having the largest size of all tables considered. Alternatively the sequence can be sorted by another criterion, such as table loads.

On this basis the method of FIG. 1 is performed in order to improve the smoothness of the initial distribution of FIG. 18. The corresponding iterations of the redistribution procedure carried out in loop 54 are illustrated by way of example in FIGS. 19 to 23.

First size and load thresholds are calculated in order to differentiate donor and recipient blades. In the preferred embodiment considered here the size threshold is defined as the theoretical storage capacity minimum per blade that would be required for a perfectly even distribution of the aggregated object sizes per blade. Likewise the load threshold is defined as the theoretical load capacity minimum per blade that would be required for a perfectly even distribution of the aggregated object loads per blade. The further processing is aimed to approximate this ideal situation despite the fact that the object granularity, i.e. table sizes and table loads are finite and vary.

In the preferred embodiment considered here the normalized size threshold TS is 0.725. The normalized size threshold TS is obtained by calculating the sum of all table sizes of tables 1-20 which is 29696 MB. This total of the table sizes is divided by the total of the storage capacities of the blades, which is 20×4096 MB in the example considered here. This yields TS=0.725. Likewise normalized load threshold TL is calculated by dividing the sum of all table loads by the sum of the load capacities of the blades. This yields TL=0.77.

Blades having an aggregated table size below threshold TS and having an aggregated table load below threshold TL are by definition recipient blades; all other blades are donor blades by definition. A donor blade has an aggregated table size above threshold TL and/or an aggregated table load above threshold TL. Taking the initial distribution of tables to blades provided by the method of FIG. 3 as a starting point (as shown in FIG. 18), only blade 10 is a recipient blade whereas all other blades 1 to 9 are donor blades.

After the donor and recipient blades have been identified, the processing of the tables starts in the order of the sequence, starting with the largest table in the ordered sequence. In other words, the processing starts with the left most table in the sequence, i.e. table 20, from where it proceeds to the smallest table in the sequence, i.e. table 14.

The largest table of a donor blade that fits on the recipient blade considering both its load and its size is table 17 on blade 7. Initially the normalized standard deviation s of the normalized aggregated table sizes is s(size)=0.1908 and the standard deviation s(load) of the normalized aggregated table loads is 0.2215. When table 17 is tentatively moved from blade 7 to blade 10 s(load) drops to 0.2009 but s(size) increases to 0.2104. As a consequence the considered tentative reassignment is de-asserted and the initial assignment of tables to blades remains unchanged.

The next table in the ordered sequence that fits on recipient blade 10 regarding its size and load is table 9 on blade 8. When table 9 is tentatively moved from blade 8 to blade 10 s(load) decreases to 0.1708 but s(size) increases to 0.2611. As s(size) increases when table 9 is removed from blade 8 to blade 10 this tentative reassignment is deasserted and the initial assignment of tables to blades is maintained.

Figure 22:
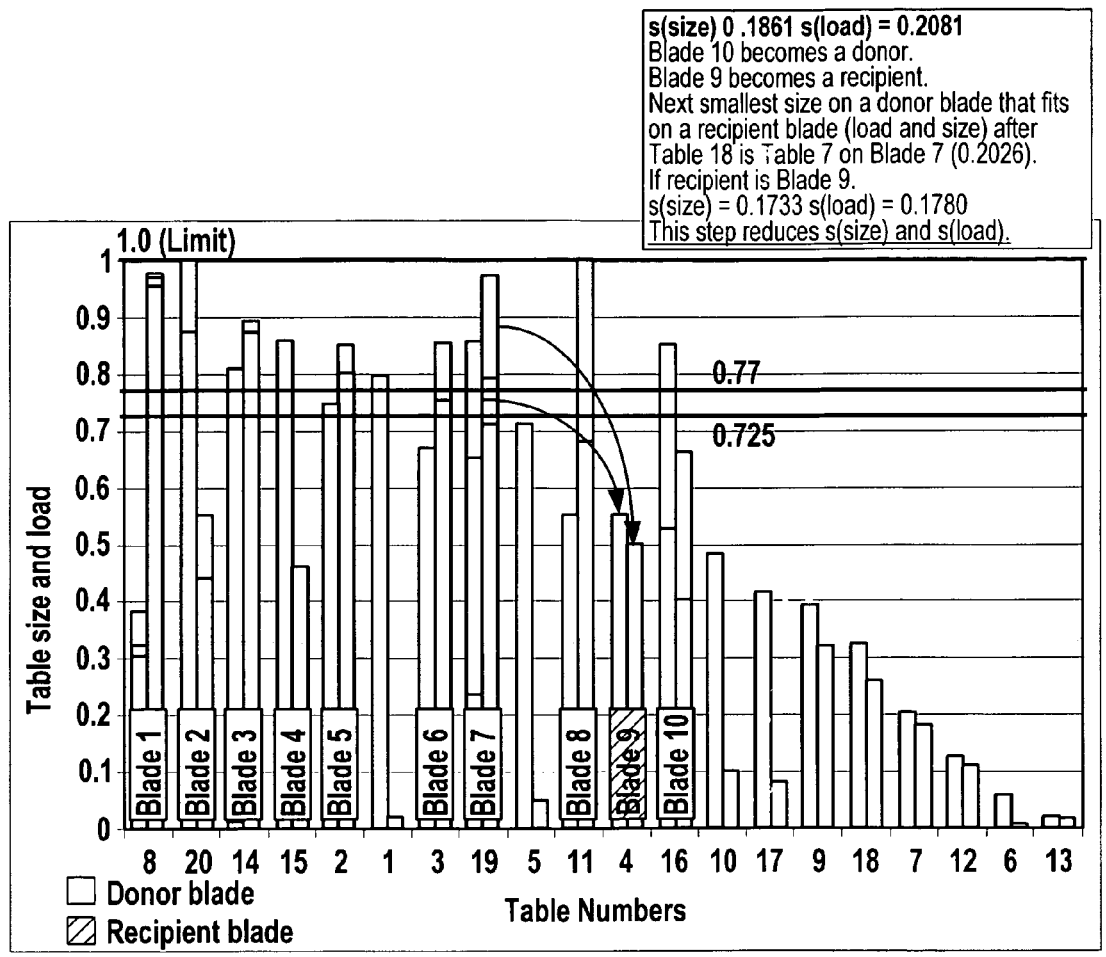

The next table in the ordered sequence of tables that fits on recipient blade 10 is table 18 on blade 9. When table 18 is tentatively moved from blade 9 to blade 10 s(size) drops to 0.1861 and s(load) drops to 0.2081. As both s(size) and s(load) decrease this indicates an improved smoothness of the distribution. As a consequence the tentative reassignment of table 18 from blade 9 to blade 10 is asserted which provides the distribution as shown in FIG. 22. By moving table 18 from blade 9 to blade 10, blade 10 becomes a donor blade because the aggregated table size of tables assigned to blade 10 exceeds the size threshold $T_S$ as apparent from FIG. 22. In contrast, blade 9 becomes a recipient blade as both the aggregated table size and aggregated table load of tables assigned to blade 9 drop below the respective thresholds $T_L$ and $T_S$. In the distribution of FIG. 22 blade 9 is the only recipient blade. The next table in the ordered sequence of tables after table 18 that fits on recipient blade 9 is table 7 on blade 7. Tentatively moving table 7 from blade 7 to blade 9 reduces s(size) to 0.1733 and s(load) to 0.1780. Hence this tentative redistribution is asserted as illustrated in FIG. 22. As there is no recipient in the resulting distribution of FIG. 22, the redistribution procedure stops here.

Figure 23:
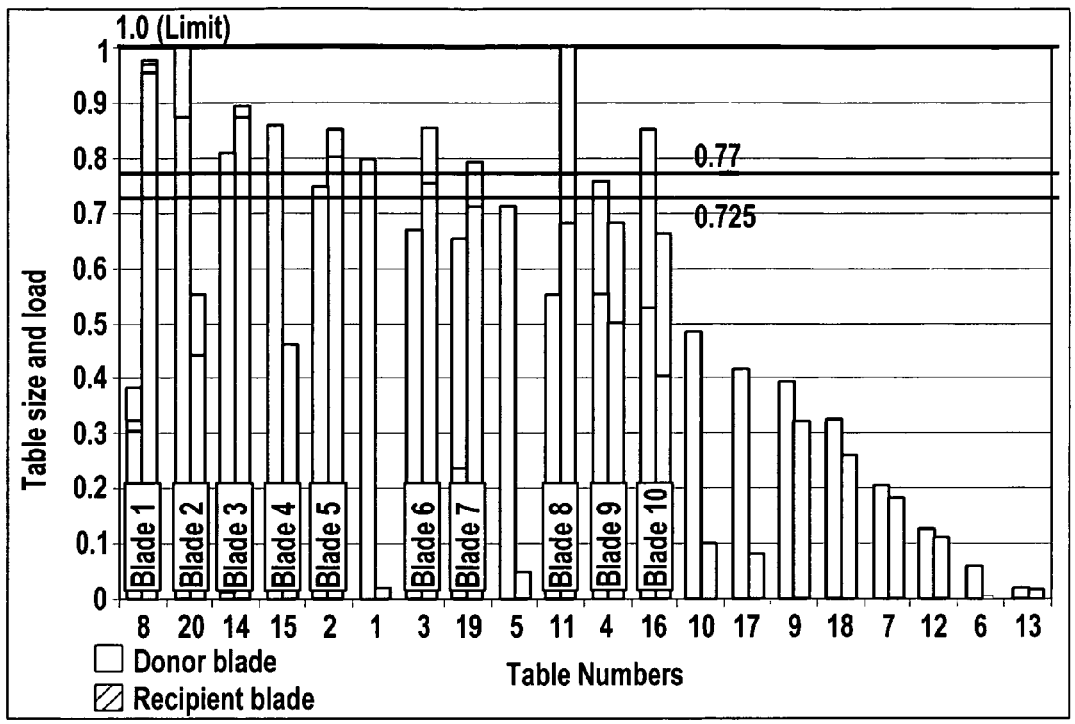

FIG. 23 shows the final distribution that is obtained by the method of FIG. 1. The final s(size) is 0.1733 and the final s(load) is 0.1780 which is a substantial improvement in comparison to the starting point illustrated in FIG. 19.

Figure 24A:
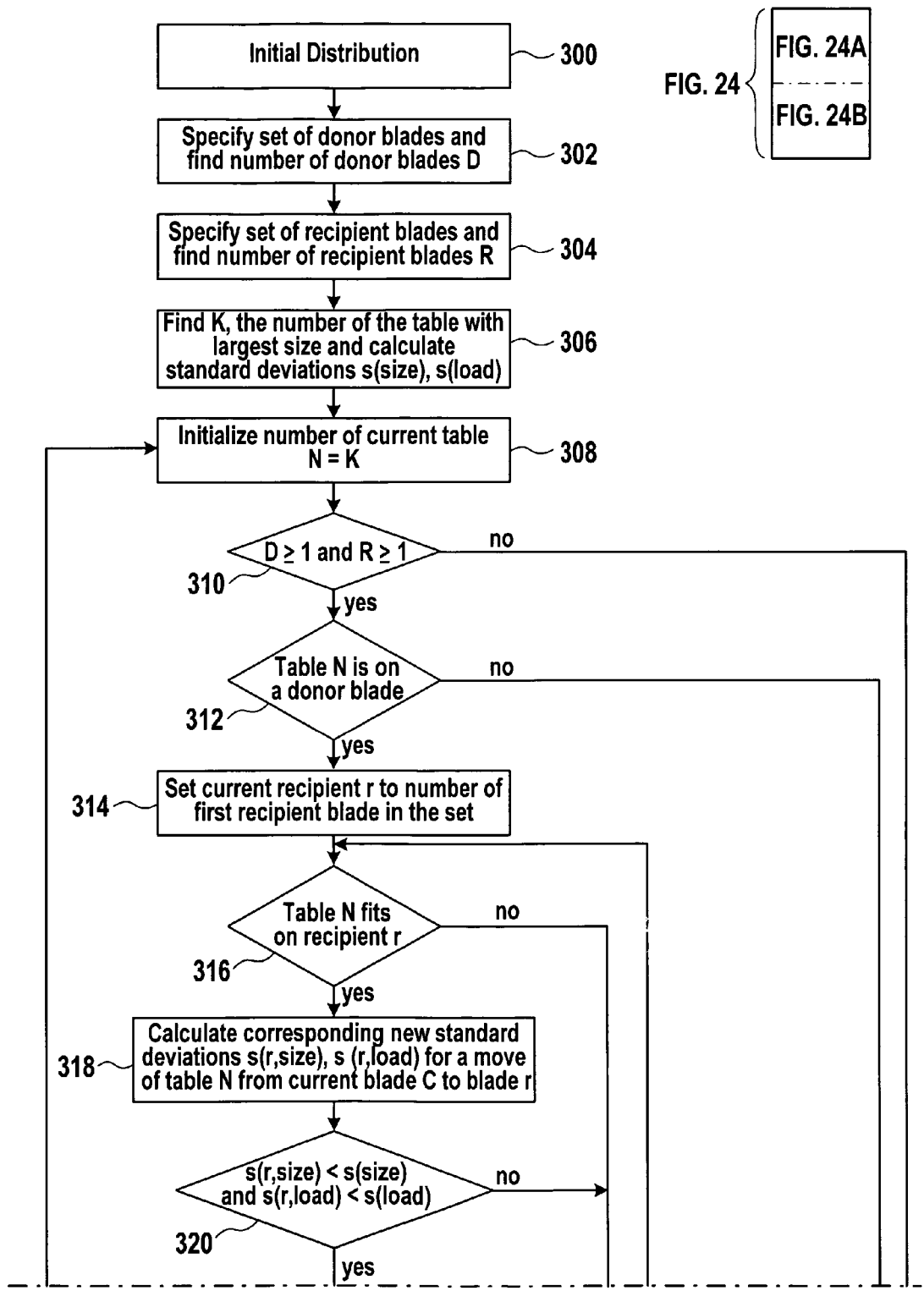
FIG. 24 shows a more detailed embodiment of the method of FIG. 1.
Figure 24B:
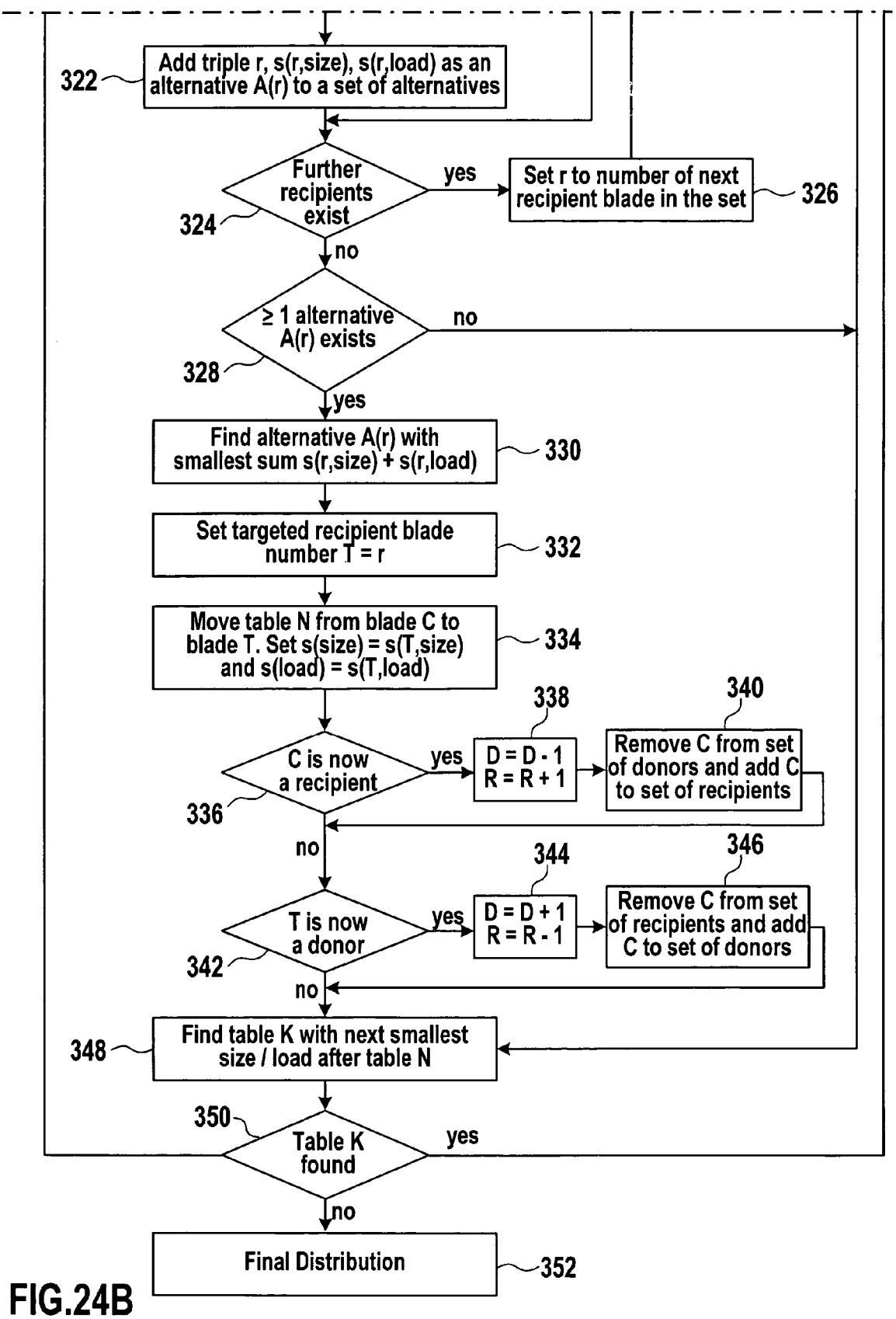

FIG. 24 shows a more detailed embodiment of the redistribution method of FIG. 1.

In step 300 an initial distribution of tables to blades is provided. For example, this can be done by means of the method of FIG. 3. Alternatively any other distribution can be used as a starting point, e.g. a real live distribution of an existing blade computing system. It is to be noted that it is not essential for the present invention that the initial distribution has the minimum number of blades.

In step 302 the set of donor blades in the initial distribution is determined. Preferably this is done by using a size and load threshold level. For example, the size threshold level is obtained by calculating the total of all table sizes and dividing the total of all table sizes by the number of blades; the load threshold level is obtained by calculating the total of all table loads and dividing the total of all table loads by the number of blades. In addition the size and load thresholds can be normalized.

Those blades that have tables having an aggregated table size surpassing the size threshold and/or having an aggregated table load surpassing the load threshold are by definition donor blades. The number of donor blades in the initial distribution is denoted D.

Likewise the set of recipient blades in the initial distribution is determined. By definition a blade that is not a donor blade is a recipient blade. Both the aggregated table size and aggregated table load of a recipient blade are below the respective size and load threshold levels. The number of recipient blades is denoted R.

In the example considered here the tables are sorted by size in order to provide an ordered sequence. It is to be noted that alternatively the tables can be sorted by load in order to provide the ordered sequence.

In step 306 the largest table K in the initial distribution is identified. Further, the standard deviations s(size) and s(load) of the initial distribution are calculated.

In step 308 the number N of the current table is initialized to K.

In step 310 a determination is made whether D>=1 and R>=1. If this is not the case, there is either no recipient or no donor blade such that none of the tables can be reassigned. In this instance the initial distribution cannot be further improved and the control goes to step 352.

If it is determined in step 310 that there is in fact at least one donor blade and at least one recipient blade, the control goes to step 312. In step 312 a determination is made whether table N is on a donor blade. If this is not the case the control goes to step 348. In step 348 the next smallest table K after the table N is searched. In step 350 it is decided if such a smaller table K has been found. If this is not the case, the control stops in step 352. If the contrary is the case the control goes back to step 308.

If it has been determined in step 312 that table N is in fact on a donor blade, the process goes on to step 314 where one of the recipient blades in the set of recipient blades is arbitrarily chosen as the current recipient r in order to investigate a corresponding tentative reassignment of table N.

In step 316 a determination is made whether table N fits on recipient r. If this is the case the standard deviation s(r) of the resulting tentative distribution obtained by moving table N from its current blade C to blade r is calculated. In step 320 it is determined whether the standard deviations s(r, size) and s(r, load) are both below the respective standard deviations s(size) and s(load) of the current distribution.

If this is the case blade r becomes a candidate blade as a target for reassigning table N. Blade r and the corresponding standard deviations s(r, size) and s(r, load) are stored in array A in step 322. It is to be noted that instead of an array A another suitable data structure can be used for storage of triples r, s(r, size), s(r, load), such as a linear pointer list, a file, or another data structure.

From step 322 the control goes to step 324 where a determination is made whether further recipient blades exist in the current distribution that need to be processed. If this is the case the control goes to step 326 where r is set to the number of the next recipient blade in the set of recipient blades that has not been processed so far. From step 326 the control goes back to step 316.

If it turned out in step 316 that table N does not fit on recipient r or if it turned out in step 320 that s(r, size) and/or s(r, load) are not below the respective standard deviations s(size) and s(load), the control goes directly from step 316 to step 320 to step 324.

After all recipients in the set of recipient blades have been processed the control goes to step 328. In case there is no triple r, s(r, size), s(r, load), in the array A the control goes directly from step 328 to step 348 in order to initiate the consecutive iteration, if any.

If there is at least one entry in array A the control goes from step 328 to step 330. In step 330 the entry r of array A having the smallest sum s(r, size)+s(r, load) is identified. In consecutive step 332 the target recipient blade T for moving of table N is set to r. In step 334 table N is moved from donor blade C to recipient blade T and s(size) is set to s(T, size); s(load) is set to s(T,load).

In step 336 a determination is made whether blade C has become a recipient blade due to the move. If this is the case the numbers D and R are adapted correspondingly in step 338. Blade C is removed from the set of donor blades and added to the set of recipient blades in step 340 from where the control goes to step 342. If blade C has not become a recipient blade the control goes directly from step 336 to step 342. In step 342 it is determined whether blade T has become a donor blade. If this is the case the numbers D and R are adapted correspondingly in step 344 and blade C is removed from the set of recipient blades and added to the set of donor blades in step 346. From there the control goes to step 348. In case it is determined in step 342 that blade T has not become a donor blade, the control goes directly from step 342 to step 348.

The loop consisting of steps 308 to step 350 is carried out until all tables have been processed in descending order. The final distribution which is thus obtained is output in step 352.

Figure 25:
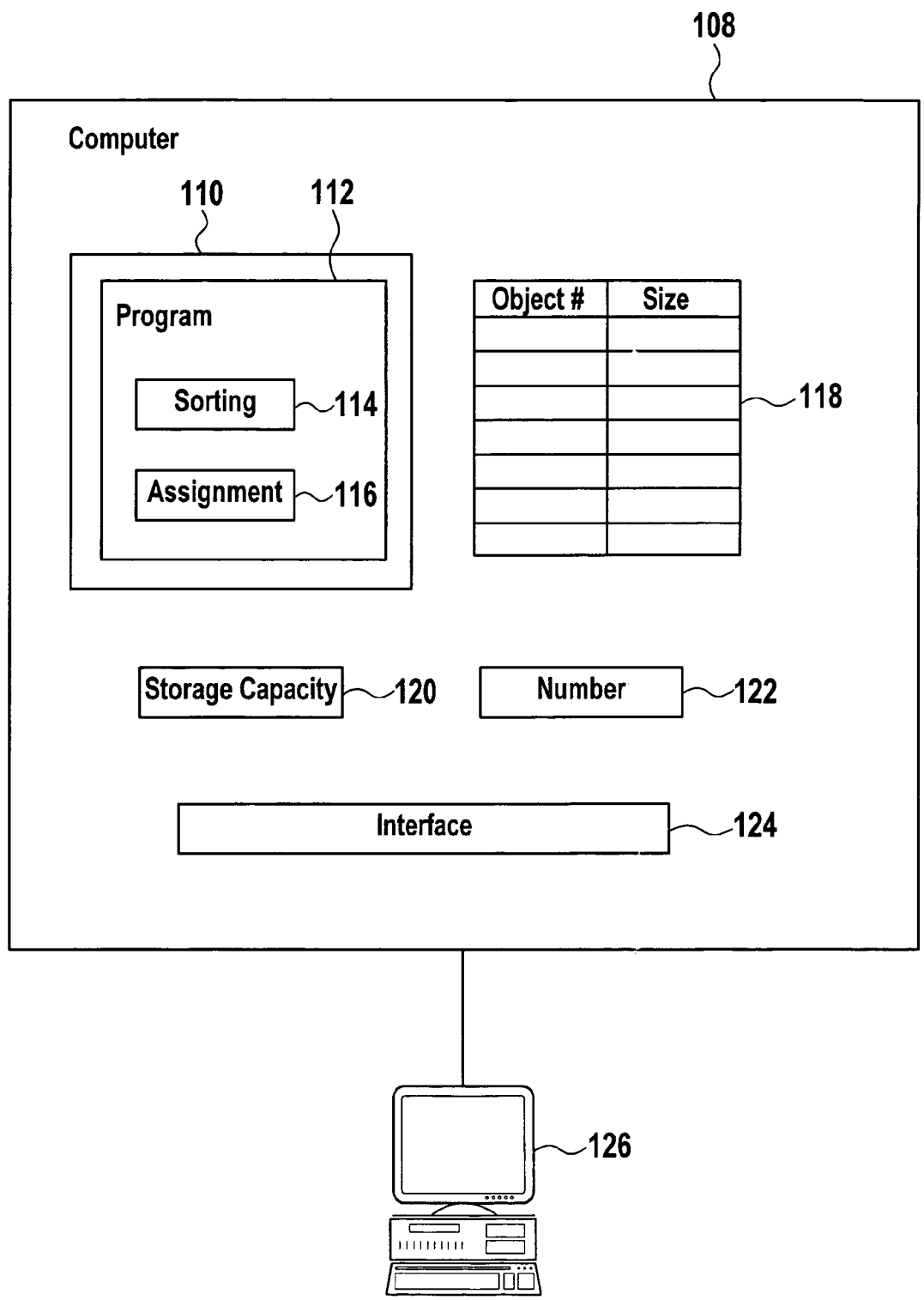
FIG. 25 shows a computer system performing the assignment and reassignment of objects to blades.

FIG. 25 shows a computer 108, which has processor 110 for running program 112. Program 112 has module 114 for sorting of objects by size and module 116 for assigning of objects to blades.

Further computer 108 has storage 118 for storing a table listing the objects and object sizes to be assigned to blades, storage 120 for storage of a storage capacity value of the blades and storage 122 for storing of the number of blades. Further computer 108 has interface 124 for coupling to workstation 126.

In operation the table with the object names/numbers and object sizes is entered via interface 124 and stored in storage 118. This corresponds to the information shown in FIG. 4.

Further a storage capacity value for the storage capacity of each individual blade is entered via interface 124 and stored in storage 120. In the example considered here, the storage capacity value is 4 GB for all blades.

Next program 112 is invoked. Program 112 sorts the table of storage 118 by size to provide a sequence of objects. Next module 116 performs the method of FIG. 3 in order to determine the minimum number of required blades. This minimum number is stored in storage 122 and is output via user interface 124. This number can be a basis for a user's investment decision for purchasing the number of blades to realize a data processing system being capable of handling the objects as listed in the table.

Next module 116 performs the method of FIG. 1 and/or FIG. 24 for refinement of the object size balancing taking the output obtained by execution of the method of FIG. 3 as a starting point.

Alternatively, computer 108 is one of the blades. In this instance computer 108 can dynamically change the assignment of objects to blades when object sizes change. This way frequent swapping operations for swapping objects between blades can be avoided.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of assigning objects to processing units of a cluster of processing units, each of the objects having an object size and an object load, each of the processing units having a storage capacity and a load capacity, the method comprising:

providing an ordered sequence of objects, the ordered sequence being sorted by a sorting criterion;

providing an initial distribution of the objects to the processing units; and processing the objects in the order of the ordered sequence by:

determining a first set of processing units, each processing unit of the first set having at least one of an aggregated size of assigned objects above a size threshold and an aggregated load of assigned objects above a load threshold;

determining a second set of processing units, each processing unit of the second set having at least one of an aggregated size of assigned objects below the size threshold and an aggregated load of assigned objects below the load threshold; and determining whether a processing unit of the second set exists having sufficient remaining storage capacity and sufficient remaining load capacity for an object being assigned to a processing unit of the first set, and, if affirmative, tentatively reassigning the object to the processing unit of the second set, calculating a statistical size distribution measure and a statistical load distribution measure for the resulting tentative distribution of the objects to the processing units, and reassigning the object to the processing unit of the second set if both the statistical size distribution measure and the statistical load distribution measure indicate an improved smoothness of the tentative distribution.

2. The method of claim 1, wherein the sorting criterion is at least one of object size and object load.

3. The method of claim 1, wherein providing the initial distribution of the objects to the processing units further comprises for each processing unit of the cluster:

calculating an index based on object size and object load for each one of the objects;

sorting the objects by index to provide a sequence of objects; and for each processing unit of the cluster:

assigning one or more of the objects to the processing unit in sequential order until at least one of a remaining storage capacity and a remaining load capacity of the processing unit is too small for consecutive objects of the sequence; and deleting the objects that are assigned to the processing unit from the sequence.

4. The method of claim 3, wherein assigning and deleting the one or more objects is done repeatedly until the sequence is empty in order to provide a minimum number of the processing units.

5. The method of claim 3, wherein the remaining storage capacity is determined by the difference between the storage capacity and the aggregated size of objects being assigned to the processing unit.

6. The method of claim 5, wherein the remaining load capacity is determined by the difference between the load capacity and the aggregated loads of objects being assigned to the processing unit.

7. The method of claim 6, further comprising:

determining a first largest gap between the aggregated size of objects being assigned to one of the processing units and the storage capacity;

determining a second largest gap between the aggregated load of objects being assigned to one of the processing units and the load capacity;

subtracting the first largest gap divided by the number of processing units from the storage capacity to provide a first threshold;

subtracting the second largest gap divided by the number of processing units from the load capacity to provide a second threshold; and assigning and deleting the one or more objects again, wherein the remaining storage capacity is the difference between the aggregated size of the objects being assigned to the processing unit and the first threshold, and wherein the remaining load capacity is the difference between the aggregated load of the objects being assigned to the processing unit and the second threshold.

8. The method of claim 4, further comprising:

determining a total of the sizes of the objects;

determining a total of the loads of the objects;

determining a first difference between a total of the storage capacities of the minimum number of processing units and the total of the sizes of the objects;

determining a second difference between a total of the load capacities of the minimum number of processing units and the total of the load of the objects;

subtracting the first difference divided by the minimum number of processing units from the storage capacity to provide a first threshold;

subtracting the second difference divided by the minimum number of processing units from the load capacity to provide a second threshold;

assigning and deleting the one or more objects again, wherein the remaining storage capacity is determined by the difference between the aggregated size of the objects being assigned to the processing unit and the first threshold, and wherein the remaining load capacity is determined by the difference between the aggregated load of the objects being assigned to the processing unit and the second threshold;

determining whether, as a result of assigning and deleting the one or more objects again, there is an excess amount of memory requirement for one of the processing units that surpasses the first threshold, and, if affirmative, dividing the excess amount by the minimum number of processing units and increasing the first threshold by the result of the division;

determining whether, as result of assigning and deleting the one or more objects again, there is an excess load requirement for one of the processing units that surpasses the second threshold, and, if affirmative, dividing the excess load by the minimum number of processing units and increasing the second threshold by the result of the division; and assigning and deleting the one or more objects again, and determining whether to divide the excess amount of memory requirement and the excess load requirement until there is no excess amount of memory requirement and no excess load requirement.

9. The method of claim 8, further comprising:

stepwise varying the first and second thresholds between respective first and second limits;

assigning and deleting the one or more objects for each first and second threshold value, whereby the remaining storage capacity is the difference between the aggregated size of the objects being assigned to the processing unit and the first threshold, and wherein the remaining load capacity is the difference between the aggregated load of the objects being assigned to the processing unit and the second threshold, and wherein a statistical measure is calculated for the assignment of objects to the processing units; and selecting one of the assignments of objects to processing units based on the statistical measure.

10. The method of claim 9, wherein the first limit of the first threshold is given by the aggregated size of the objects divided by the minimum number of processing units, and wherein the second limit of the first threshold is given by the storage capacity, and wherein the first limit of the second threshold is given by the aggregated load of the objects divided by the minimum number of processing units, and wherein the second limit of the second threshold is given by the load capacity.

11. The method of claim 9, wherein the statistical measure is calculated by calculating at least one of a standard deviation and a variance of the totals of the indices of objects assigned to one processing unit.

12. The method of claim 1, wherein the objects are database tables of various sizes.

13. The method of claim 1, wherein each of the processing units is at least one of a blade and a blade server.

14. The method of claim 3, wherein the index of an object is calculated based on the sum of the normalized object size and object load and based on the absolute value of a difference between the normalized object size and the normalized object load.

15. The method of claim 1, wherein the size threshold is the aggregated size of the objects divided by the number of processing units and the load threshold is the aggregated load of the objects divided by the number of processing units.

16. The method of claim 1, wherein the statistical size distribution measure is calculated on the basis of the aggregated sizes of the objects assigned to processing units and the statistical load distribution measure is calculated on the basis of the aggregated loads of objects assigned to processing units.

17. The method of claim 16, wherein the statistical size distribution measure is at least one of a variance and a standard deviation of the aggregated sizes of objects assigned to processing units and the statistical load distribution measure

17 is at least one of a variance and a standard deviation of the aggregated loads of objects assigned to processing units.

18. The method of claim 1, wherein if there exists more than one processing unit of the second set having sufficient remaining storage capacity and sufficient remaining load capacity for the object being assigned to a processing unit of the first set:
  determining tentative distributions by tentatively assigning the object to each one of the processing units of the second set that have sufficient remaining storage capacity and sufficient remaining load capacity;
  calculating the statistical size distribution measure and the statistical load distribution measure for each tentative distribution; and
  reassigning the object to one of the processing units of the second set to which the object has been tentatively assigned and for which the statistical size distribution measure, the statistical load distribution measure and the sum of the statistical size and load distribution measures indicate the largest improvement as regards smoothness of the corresponding tentative distribution.

19. A data processing system for assigning objects to processing units of a cluster of processing units comprising:
  a memory for storing an ordered sequence of objects, each object having an object size and an object load, and for storing an initial distribution of the objects to a plurality of processing units, wherein each processing unit having a storage capacity and a load capacity;
  a processor for processing the objects in the order of the ordered sequence by:
  determining a first set of processing units, each processing unit of the first set having at least one of an aggregated size of assigned objects above a size threshold and an aggregated load of assigned objects above a load threshold;
  determining a second set of processing units, each processing unit of the second set having at least one of an aggregated size of assigned objects below the size threshold and an aggregated load of assigned objects below the load threshold; and
  determining whether a processing unit of the second set exists having sufficient remaining storage capacity and sufficient remaining load capacity for an object being assigned to a processing unit of the first set, and, if affirmative, tentatively reassigning the object to the processing unit of the second set, calculating a statistical size distribution measure and a statistical load distribution measure for the resulting tentative distribution of the objects to the processing units, and reassigning the object to the processing unit of the second set if both the statistical size distribution measure and the statistical load distribution measure indicate an improved smoothness of the tentative distribution.

20. The data processing system of claim 19, wherein the processor determines a minimum number of processing units of the cluster of processing units for the objects.

21. The data processing system of claim 20, wherein the processor
  calculates an index based on object size and object load for each one of the objects;

18 assigns one or more of the objects to a processing unit in sequential order until at least one of a remaining storage capacity and a remaining load capacity of the processing unit is too small for consecutive objects of the sequence; and
  deletes the objects that are assigned to the processing unit from the sequence.

22. The data processing system of claim 19, wherein the processor is adapted to perform the following if there exists more than one processing unit of the second set having sufficient remaining storage capacity and sufficient remaining load capacity for the object:
  determining tentative distributions by tentatively assigning the object to each one of the processing units of the second set that have sufficient remaining storage capacity and sufficient remaining load capacity;
  calculating the statistical size distribution measure and the statistical load distribution measure for each tentative distribution; and
  reassigning the object to one of the processing units of the second set to which the object has been tentatively assigned and for which the statistical size distribution measure, the statistical load distribution measure and the sum of the statistical size and load distribution measures indicate the largest improvement as regards smoothness of the corresponding tentative distribution.

23. A computer-readable medium for storing a set of instructions for assigning objects to a plurality of blade servers based on an ordered sequence of the objects and based on an initial distribution of the objects to the blade servers, which instructions when executed by a processor reassign an object by processing the objects in the order of the ordered sequence by performing stages comprising:
  determining a first set of the blade servers, each blade server of the first set having at least one of an aggregated size of assigned objects above a size threshold and an aggregated load of assigned objects above a load threshold;
  determining a second set of blade servers, each blade server of the second set having at least one of an aggregated size of assigned objects below the size threshold and an aggregate load of assigned objects below the load threshold, and
  determining whether there exists a blade server of the second set having sufficient remaining storage capacity and sufficient remaining load capacity for an object being assigned to a blade server of the first set, and, if affirmative, tentatively assigning the object to the blade server of the second set, calculating a statistical size distribution measure and a statistical load distribution measure for the resulting tentative distribution of the objects to the blade servers, and reassigning the objects to the blade server of the second set if the statistical size distribution measure, the statistical load distribution measure and the sum of the statistical load distribution measure indicate an improved smoothness of the tentative distribution.

* * * * *

UNITED STATES PATENT AND TRADEMARK OFFICE
CERTIFICATE OF CORRECTION

PATENT NO. : 7,752,628 B2  
APPLICATION NO. : 11/053899  
DATED : July 6, 2010  
INVENTOR(S) : Sauermann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1522 days.

Signed and Sealed this
Twenty-second Day of March, 2011

David J. Kappos
*Director of the United States Patent and Trademark Office*